(12) United States Patent
Jiang et al.

(10) Patent No.: US 10,644,859 B2
(45) Date of Patent: May 5, 2020

(54) UNIFIED FRAME STRUCTURE

(71) Applicant: QUALCOMM Incorporated, San Diego, CA (US)

(72) Inventors: Jing Jiang, San Diego, CA (US); Peter Pui Lok Ang, San Diego, CA (US); Joseph Binamira Soriaga, San Diego, CA (US); Krishna Kiran Mukkavilli, San Diego, CA (US); Tingfang Ji, San Diego, CA (US); Kambiz Azarian Yazdi, San Diego, CA (US); Naga Bhushan, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/033,861

(22) Filed: Jul. 12, 2018

(65) Prior Publication Data

US 2018/0323943 A1 Nov. 8, 2018

Related U.S. Application Data

(63) Continuation of application No. 14/720,579, filed on May 22, 2015, now Pat. No. 10,027,462.
(Continued)

(51) Int. Cl.
*H04L 5/00* (2006.01)
*H04L 27/26* (2006.01)

(52) U.S. Cl.
CPC ........ *H04L 5/0092* (2013.01); *H04L 27/2602* (2013.01); *H04L 5/0044* (2013.01); *H04L 5/0053* (2013.01)

(58) Field of Classification Search
CPC ..... H04L 5/0048; H04L 5/0044; H04L 5/001; H04L 5/0055; H04L 5/0051;
(Continued)

(56) References Cited

U.S. PATENT DOCUMENTS 8,213,345 B2 7/2012 Suo et al.
8,457,151 B2 6/2013 Yamada et al.
(Continued)

FOREIGN PATENT DOCUMENTS

CN 101414870 A 4/2009
CN 101911534 A 12/2010
(Continued)

OTHER PUBLICATIONS

Samsung: "(E)PDCCH Coverage Enhancements for low-cost MTC", 3GPP TSG-RAN WG1#72b R1-131017, Apr. 19, 2013, 2 Pages, URL:http://www3gpp.org/ftp/tsg_ran/WG1_RL1/TSGR1_72b/Docs/R1-131017.zip.
(Continued)

*Primary Examiner* — Jae Y Lee
*Assistant Examiner* — Aixa A Guadalupe Cruz
(74) *Attorney, Agent, or Firm* — Qualcomm IP Dept.; James Hunt Yancey, Jr.

(57) ABSTRACT

A unified frame structure design includes multiple structures to support multiple access requirements. In some aspects, traffic communicated according to one structure may puncture traffic communicated according to another structure. In some aspects, an indication of the puncturing may be communicated. In some aspects, communication based on the unified frame structure may use a code block-level acknowledgement. In some aspects, different access requirements may relate to different access terminal categories and/or different applications. In some aspects, different access terminal categories may relate to different perfor-
(Continued)

mance requirements of different access terminals. In some aspects, the disclosed unified frame structure design could support, for example, and without limitation, at least one of: a low latency mode, a low overhead mode, a low power mode (e.g., for micro-sleep and/or dynamic bandwidth switching), an access terminal with narrowband capability operating in wideband, or ultra-low-latency and nominal multiplexing.

37 Claims, 15 Drawing Sheets

Related U.S. Application Data

(60) Provisional application No. 62/073,877, filed on Oct. 31, 2014.

(58) Field of Classification Search
CPC ..... H04L 5/0035; H04L 5/005; H04L 5/0096; H04L 1/1893; H04L 27/2647; H04L 5/003; H04L 1/0018; H04L 1/0068; H04L 2012/5624; H04W 72/0446; H04W 4/005; H04W 72/0453; H04W 74/0833; H04W 16/14; H04W 88/08; H04B 1/713; H04B 7/0413; H04B 7/0697; H04B 7/0452; H04J 13/004; H04J 2013/0088
See application file for complete search history.

(56) References Cited

U.S. PATENT DOCUMENTS

| | | |
|---|---|---|
| 8,467,331 B2 | 6/2013 | Lakkis |
| 9,749,999 B2* | 8/2017 | ElArabawy ............ H04L 5/0057 |
| 2007/0064669 A1 | 3/2007 | Classon et al. |
| 2008/0170545 A1 | 7/2008 | Kim et al. |
| 2009/0116427 A1 | 5/2009 | Marks et al. |
| 2011/0002320 A1 | 1/2011 | Yuk et al. |
| 2012/0063374 A1 | 3/2012 | Lim et al. |
| 2013/0176902 A1* | 7/2013 | Wentink ............ H04W 52/0219 370/255 |
| 2014/0071954 A1 | 3/2014 | Au et al. |
| 2014/0233437 A1 | 8/2014 | Abdoli et al. |
| 2015/0256249 A1 | 9/2015 | Doetsch et al. |
| 2016/0128056 A1 | 5/2016 | Jiang et al. |

FOREIGN PATENT DOCUMENTS

| | | |
|---|---|---|
| KR | 20080002901 A | 1/2008 |
| KR | 20080059001 A | 6/2008 |
| KR | 20090039572 A | 4/2009 |
| KR | 20100092475 A | 8/2010 |
| KR | 20120017429 A | 2/2012 |
| KR | 20130000421 A | 1/2013 |
| WO | 2010030611 A2 | 3/2010 |
| WO | 2013166689 A1 | 11/2013 |
| WO | 2014067799 A1 | 5/2014 |
| WO | 2018034687 A1 | 2/2018 |

OTHER PUBLICATIONS

Taiwan Search Report—TW104134712—TIPO—dated Dec. 17, 2018.
Cho J., et al., "Proposed 802.16m Frame Structure; S80216m-08 0620," IEEE Draft; S80216M-08 062R1; vol. 802.16m, No. r1, Jan. 20, 2008 (Jan. 20, 2008), pp. 1-27, XP017795989, IEEE-SA, Piscataway, NJ USA [retrieved on Jan. 20, 2008].
International Search Report and Written Opinion—PCT/US2015/056983—ISA/EPO—dated Jan. 27, 2016.
Motorola: "Performance of 4 Antenna Pilot Proposals for EUTRA," 3GPP Draft; R1-063052 Four Antenna Pilots, 3rd Generation Partnership Project (3GPP), Mobile Competence Centre, vol. RAN WG1, Nov. 2, 2006 (Nov. 2, 2006), pp. 1-6, XP050103515, Sophia-Antipolis Cedex; France [retrieved on Nov. 2, 2006].
Wunder G., et al., "5GNOW: Non-Orthogonal, Asynchronous Waveforms for Future Mobile Applications", IEEE Communications Magazine, IEEE Service Center, Piscataway, US, vol. 52, No. 2, Feb. 12, 2014 (Feb. 12, 2014), pp. 97-105, XP011539680, ISSN: 0163-6804, DOI: 10.1109/MCOM.2014.6736749 [retrieved on Feb. 10, 2014] p. 99-p. 100; figure 2.

* cited by examiner

UNIFIED FRAME STRUCTURE

CROSS-REFERENCE TO RELATED APPLICATION(S)

This application is a continuation of non-provisional patent application Ser. No. 14/720,579 filed in the U.S. Patent and Trademark Office on May 22, 2015, and claims priority to and the benefit of provisional patent application No. 62/073,877 filed in the U.S. Patent and Trademark Office on Oct. 31, 2014, the entire content of each of which is incorporated herein by reference.

TECHNICAL FIELD

Aspects of the disclosure relate generally to wireless communication, and more specifically, but not exclusively, to a unified frame structure.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. For example, in 3rd Generation Partnership Project (3GPP) Long Term Evolution (LTE), enhanced Node Bs (eNBs) provide network connectivity for user equipment (UE) within the coverage areas of the eNBs.

In conventional wireless communication networks, frame structure and control channel design is generally fixed, regardless of the type of UE or UE application, and regardless of latency, power, efficiency, and cost requirements. For instance, in LTE, the transmission time interval (TTI) is fixed at 1 millisecond (ms). Also in LTE, all categories of UEs use the same form of control channels (for example, a physical downlink control channel (PDCCH) or an enhanced PDCCH).

BRIEF SUMMARY OF SOME EXAMPLES

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a communication interface and a processing circuit coupled to the communication interface. The processing circuit is configured to: identify a first structure for scheduling first traffic within a unified frame structure, identify a second structure for scheduling second traffic within the unified frame structure, wherein the second structure schedules at least a portion of the second traffic to puncture at least a portion of the first traffic, and send, via the communication interface, the first traffic and the second traffic according to the first structure and the second structure within the unified frame structure.

In one aspect, the disclosure provides a method for communication including: identifying a first structure for scheduling first traffic within a unified frame structure; identifying a second structure for scheduling second traffic within the unified frame structure, wherein the second structure schedules at least a portion of the second traffic to puncture at least a portion of the first traffic; and sending the first traffic and the second traffic according to the first structure and the second structure within the unified frame structure.

In one aspect, the disclosure provides an apparatus configured for communication. The apparatus including: means for identifying a first structure for scheduling first traffic within a unified frame structure; means for identifying a second structure for scheduling second traffic within the unified frame structure, wherein the second structure schedules at least a portion of the second traffic to puncture at least a portion of the first traffic; and means for sending the first traffic and the second traffic according to the first structure and the second structure within the unified frame structure.

In one aspect, the disclosure provides a non-transitory computer-readable medium storing computer-executable code, including code to: identify a first structure for scheduling first traffic within a unified frame structure; identify a second structure for scheduling second traffic within the unified frame structure, wherein the second structure schedules at least a portion of the second traffic to puncture at least a portion of the first traffic; and send the first traffic and the second traffic according to the first structure and the second structure within the unified frame structure.

In one aspect, the disclosure provides an apparatus configured for communication that includes a communication interface and a processing circuit coupled to the communication interface. The processing circuit is configured to: receive, via the communication interface, first traffic scheduled according to a first structure within a unified frame structure, determine whether the first traffic was punctured by second traffic scheduled according to a second structure within the unified frame structure, and decode the first traffic based on the determination of whether the first traffic was punctured.

In one aspect, the disclosure provides a method for communication including: receiving first traffic scheduled according to a first structure within a unified frame structure; determining whether the first traffic was punctured by second traffic scheduled according to a second structure within the unified frame structure; and decoding the first traffic based on the determination of whether the first traffic was punctured.

In one aspect, the disclosure provides an apparatus configured for communication. The apparatus including: means for receiving first traffic scheduled according to a first structure within a unified frame structure; means for determining whether the first traffic was punctured by second traffic scheduled according to a second structure within the unified frame structure; and means for decoding the first traffic based on the determination of whether the first traffic was punctured.

In one aspect, the disclosure provides a non-transitory computer-readable medium storing computer-executable code, including code to: receive first traffic scheduled according to a first structure within a unified frame structure; determine whether the first traffic was punctured by second traffic scheduled according to a second structure within the unified frame structure; and decode the first traffic based on the determination of whether the first traffic was punctured.

In one aspect, the disclosure provides an apparatus configured for communication that includes a communication interface and a processing circuit coupled to the communication interface. The processing circuit is configured to:

identify a first structure for scheduling first traffic within a unified frame structure, send, via the communication interface, the first traffic according to the first structure within the unified frame structure, and receive, via the communication interface, a code block-level acknowledgement associated with the first traffic.

In one aspect, the disclosure provides a method for communication including: identifying a first structure for scheduling first traffic within a unified frame structure; sending the first traffic according to the first structure within the unified frame structure; and receiving a code block-level acknowledgement associated with the first traffic.

In one aspect, the disclosure provides an apparatus configured for communication. The apparatus including: means for identifying a first structure for scheduling first traffic within a unified frame structure; means for sending the first traffic according to the first structure within the unified frame structure; and means for receiving a code block-level acknowledgement associated with the first traffic.

In one aspect, the disclosure provides a non-transitory computer-readable medium storing computer-executable code, including code to: identify a first structure for scheduling first traffic within a unified frame structure; send the first traffic according to the first structure within the unified frame structure; and receive a code block-level acknowledgement associated with the first traffic.

In one aspect, the disclosure provides an apparatus configured for communication that includes a communication interface and a processing circuit coupled to the communication interface. The processing circuit is configured to: identify a first structure for scheduling first traffic within a unified frame structure, receive, via the communication interface, the first traffic according to the first structure within the unified frame structure, determine whether a block of the first traffic was received in error, and send, via the communication interface, a code block-level acknowledgement that indicates whether the block of the first traffic was received in error.

In one aspect, the disclosure provides a method for communication including: identifying a first structure for scheduling first traffic within a unified frame structure; receiving the first traffic according to the first structure within the unified frame structure; determining whether a block of the first traffic was received in error; and sending a code block-level acknowledgement that indicates whether the block of the first traffic was received in error.

In one aspect, the disclosure provides an apparatus configured for communication. The apparatus including: means for identifying a first structure for scheduling first traffic within a unified frame structure; means for receiving the first traffic according to the first structure within the unified frame structure; means for determining whether a block of the first traffic was received in error; and means for sending a code block-level acknowledgement that indicates whether the block of the first traffic was received in error.

In one aspect, the disclosure provides a non-transitory computer-readable medium storing computer-executable code, including code to: identify a first structure for scheduling first traffic within a unified frame structure; receive the first traffic according to the first structure within the unified frame structure; determine whether a block of the first traffic was received in error; and send a code block-level acknowledgement that indicates whether the block of the first traffic was received in error.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The disclosure relates in some aspects to frame structure and control channel design to support multiple access requirements (e.g., tiers of access) such as tiers of access terminal (e.g., UE) categories and tiers of applications. In some aspects, access requirements relate to different performance requirements of different access terminals.

The disclosure relates in some aspects to a unified frame structure that supports different structures for the different access requirements. For example, within the unified frame structure, one structure may be defined for access terminals that have a first performance requirement, another structure may be defined for access terminals that have a second performance requirement, yet another structure may be defined for access terminals that have a third performance requirement, and so on.

One or more of the techniques that follow may be provided in accordance with various aspects of the disclosure. In some aspects, an apparatus may use a flexible TTI design (e.g., employing dynamically configurable TTI lengths) to achieve various overhead/latency tradeoffs. In some aspects, an apparatus may use narrowband and time division multiplexing (TDM) cell-specific reference signal (CRS) based control to enable fast decoding, a micro-sleep state, and dynamic bandwidth switching (e.g., with TTI delay). In some aspects, an apparatus may use per-TTI control monitoring in a staggered control scenario to provide low latency. In some aspects, an apparatus may use a narrowband data and control channel to enable UEs with narrowband capability to operate in a wideband environment. In some aspects, an apparatus may use code block-level acknowledgement (ACK) feedback to enable efficient multiplexing of nominal traffic and ultra-low-latency traffic.

Figure 1:
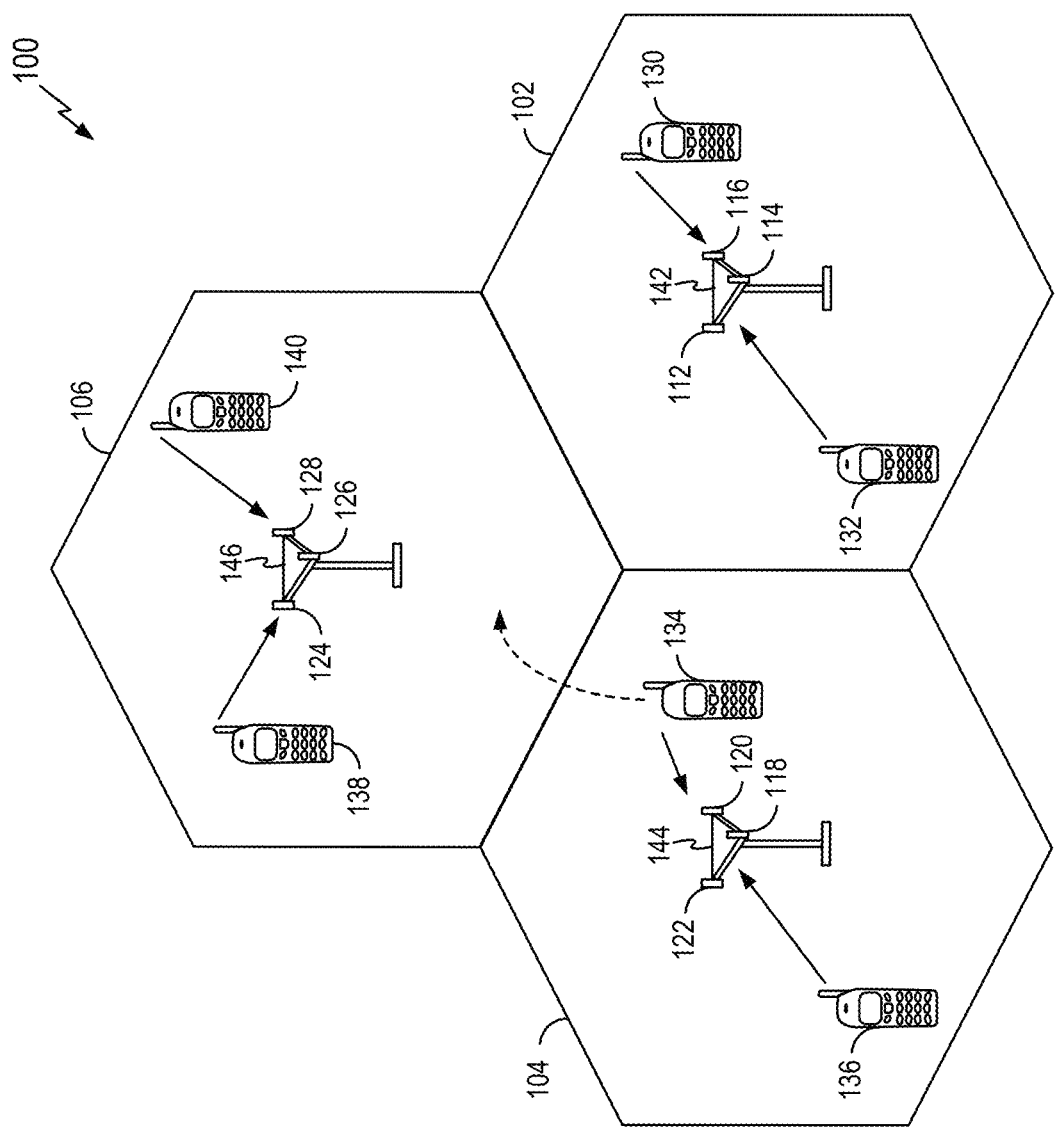
FIG. 1 is a block diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, a simplified example of an access network 100 is shown. The access network 100 can be implemented according to various network technologies including, without limitation, fifth generation (5G) technology, fourth generation (4G) technology, third generation (3G) technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The access network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in the cell 102, antenna groups 112, 114, and 116 may each correspond to a different sector. In the cell 104, antenna groups 118, 120, and 122 may each correspond to a different sector. In the cell 106, antenna groups 124, 126, and 128 may each correspond to a different sector.

The cells 102, 104, and 106 may include several access terminals (ATs) that may be in communication with one or more sectors of each cell 102, 104, or 106. For example, ATs 130 and 132 may be in communication with an access point (AP) 142, ATs 134 and 136 may be in communication with an AP 144, and ATs 138 and 140 may be in communication with an AP 146. In various implementations, an AP may be referred to or implemented as a base station, a NodeB, an eNodeB, and so on; while an AT may be referred to or implemented as a user equipment (UE), a mobile station, and so on.

Figure 2:
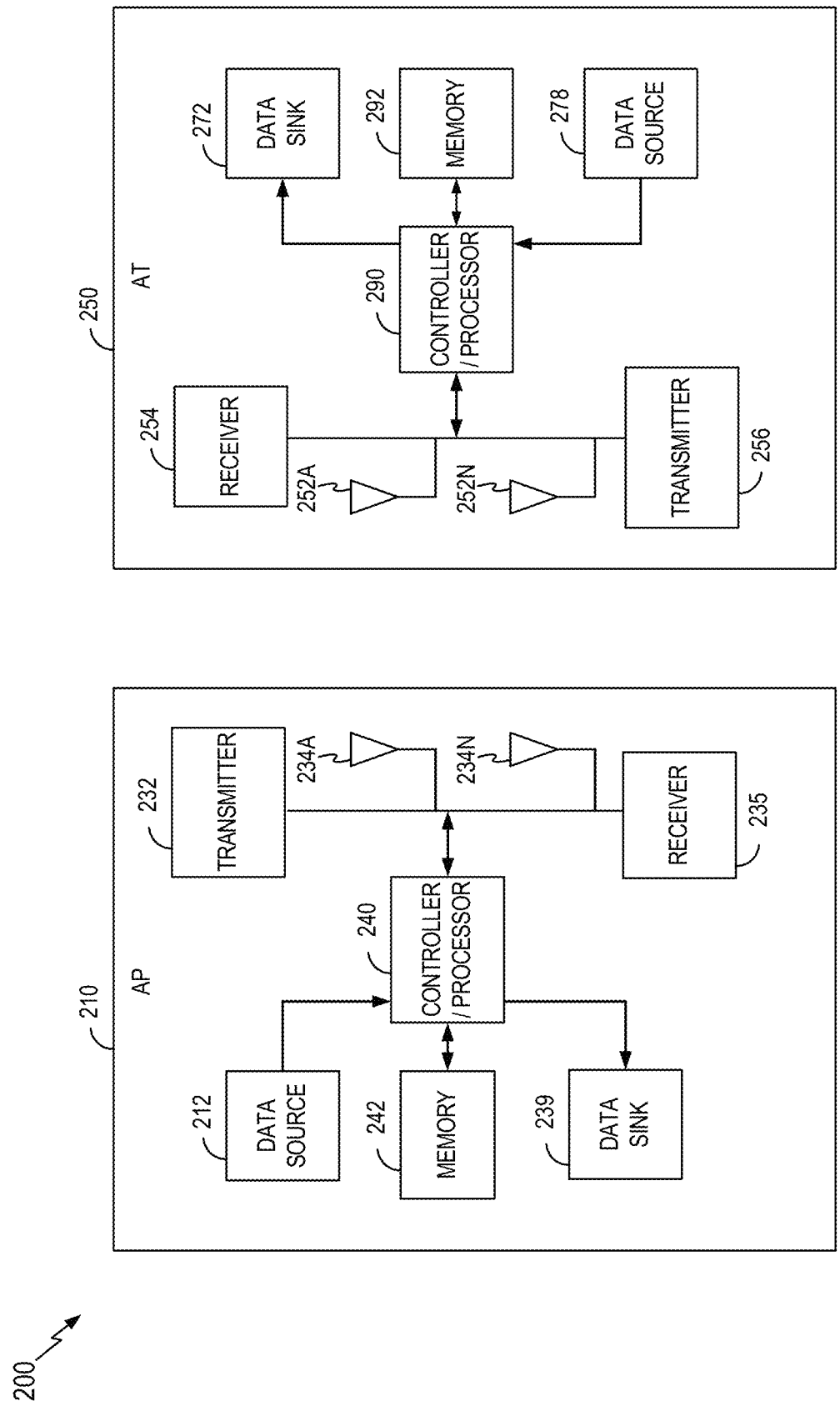
FIG. 2 is a block diagram illustrating an example of an access terminal in communication with an access point in a communication system according to some aspects of the disclosure.

FIG. 2 is a block diagram of system 200 including an access point (AP) 210 in communication with an access terminal (AT) 250, where the AP 210 and the AT 250 may be configured to provide functionality as taught herein. The AP 210 may be the AP 142, 144, or 146 in FIG. 1, and the AT 250 may be the AT 130, 132, 134, 136, 138, or 140 in FIG. 1. In various operating scenarios, the AP 210 and/or the AT 250 may be a transmitter or transmitting device, or a receiver or receiving device, or both. Examples of such transmitters, transmitting devices, receivers, and receiving devices are illustrated in FIGS. 1, 3, 5-8, 11, 13, 17, and 21.

In a downlink communication from the AP 210 to the AT 250, a controller or processor (controller/processor) 240 may receive data from a data source 212. Channel estimates may be used by the controller/processor 240 to determine the coding, modulation, spreading, and/or scrambling schemes for the transmit processor 220. These channel estimates may be derived from a reference signal transmitted by the AT 250 or from feedback from the AT 250. A transmitter 232 may provide various signal conditioning functions including amplifying, filtering, and modulating frames onto a carrier for downlink transmission over a wireless medium through antennas 234A-234N. The antennas 234A-234N may include one or more antennas, for example, including beam steering bidirectional adaptive antenna arrays, MIMO arrays, or any other suitable transmission/reception technologies.

At the AT 250, a communication interface or receiver 254 receives the downlink transmission through antennas 252A-252N (e.g., representing one or more antennas) and processes the transmission to recover the information modulated onto the carrier. The information recovered by the receiver 254 is provided to a controller/processor 290. The controller/processor 290 descrambles and despreads the symbols, and determines the most likely signal constellation points transmitted by the AP 210 based on the modulation scheme. These soft decisions may be based on channel estimates computed by the controller/processor 290. The soft decisions are then decoded and deinterleaved to recover the data, control, and reference signals. The CRC codes are then checked to determine whether the frames were successfully decoded. The data carried by the successfully decoded frames will then be provided to a data sink 272, which represents applications running in the AT 250 and/or various user interfaces (e.g., display). Control signals carried by successfully decoded frames will be provided to a controller/processor 290. When frames are unsuccessfully decoded, the controller/processor 290 may also use an acknowledgement (ACK) and/or negative acknowledgement (NACK) protocol to support retransmission requests for those frames.

In the uplink from the AT 250 to the AP 210, data from a data source 278 and control signals from the controller/processor 290 are provided. The data source 278 may represent applications running in the AT 250 and various user interfaces (e.g., keyboard). Similar to the functionality described in connection with the downlink transmission by the AP 210, the controller/processor 290 provides various signal processing functions including CRC codes, coding and interleaving to facilitate FEC, mapping to signal constellations, spreading with OVSFs, and scrambling to produce a series of symbols. Channel estimates, derived by the controller/processor 290 from a reference signal transmitted by the AP 210 or from feedback contained in a midamble transmitted by the AP 210, may be used to select the appropriate coding, modulation, spreading, and/or scrambling schemes. The symbols produced by the controller/processor 290 will be utilized to create a frame structure. The controller/processor 290 creates this frame structure by multiplexing the symbols with additional information, resulting in a series of frames. The frames are then provided to a transmitter 256, which provides various signal conditioning functions including amplification, filtering, and modulating the frames onto a carrier for uplink transmission over the wireless medium through the antennas 252A-252N.

The uplink transmission is processed at the AP 210 in a manner similar to that described in connection with the receiver function at the AT 250. A receiver 235 receives the uplink transmission through the antennas 234A-234N and processes the transmission to recover the information modulated onto the carrier. The information recovered by the receiver 235 is provided to the controller/processor 240, which parses each frame. The controller/processor 240 performs the inverse of the processing performed by the controller/processor 290 in the AT 250. The data and control signals carried by the successfully decoded frames may then be provided to a data sink 239. If some of the frames were unsuccessfully decoded by the receive processor, the controller/processor 240 may also use a positive acknowledgement (ACK) and/or negative acknowledgement (NACK) protocol to support retransmission requests for those frames.

The controller/processors 240 and 290 may be used to direct the operation at the AP 210 and the AT 250, respectively. For example, the controller/processors 240 and 290 may provide various functions including timing, peripheral interfaces, voltage regulation, power management, and other control functions. The computer readable media of memories 242 and 292 may store data and software for the AP 210 and the AT 250, respectively.

In accordance with various aspects of the disclosure, an element, or any portion of an element, or any combination of elements may be implemented with controller/processors 240 and 290 (e.g., that may each include one or more processors). The controller/processors 240 and 290 are responsible for general processing, including the execution of software stored in the memory 252 or 292. The software, when executed by the controller/processors 240 and 290, causes the controller/processors 240 and 290 to perform the various functions described below for any particular apparatus. The memory 252 or 292 may also be used for storing data that is manipulated by the controller/processors 240 and 290 when executing software.

In various aspects of the disclosure, an apparatus may be utilized in a wireless communication network, as a scheduling entity (e.g., the AP 210) and/or as a non-scheduling or subordinate entity (e.g., the AT 250). In any case, the apparatus may communicate with one or more wireless entities over an air interface. In any wireless communication network, channel conditions corresponding to the air interface will change over time.

Many networks accordingly use one or more rate control loops to dynamically adapt to the channel. For example, a transmitting device may configure one or more transmission parameters, including but not limited to a modulation and coding scheme (MCS), a transmission power, etc., to target a desired error rate at the receiving device. The receiving device that is receiving a packet-switched data stream typically checks the integrity of packets (e.g., using a cyclic redundancy check or CRC, a checksum, PHY layer channel coding pass/fail status, etc.) and may report back to the transmitting device using an acknowledgment or non-acknowledgment. This integrity check and reporting frequently, though not always, takes the form of an automatic repeat request (ARQ) and/or hybrid automatic repeat request (HARQ) algorithm. In other examples, any suitable algorithm or means of providing feedback information or response transmissions from the receiving device to the transmitting device may be used, such as reports relating to channel quality.

Example Frame Structure and Control Design

The disclosure relates in some aspects to frame structure and control design to support different access terminals (e.g., UEs) and/or applications. For example, and without limitation, different frame structures could be used for at least one of: different access terminals, different applications associated with the access terminals, or different modes of operation for the access terminals.

The disclosed frame structure and control channel design could support, for example, and without limitation, at least one of: a low latency mode, a low overhead mode, a low power mode (e.g., for micro-sleep and/or dynamic bandwidth (BW) switching), an access terminal (e.g., a UE) with narrowband processing capability operating in wideband, or multiplexing of ultra-low-latency traffic and nominal traffic.

The disclosure relates in some aspects to a frame structure that supports dynamic TTI durations for different access terminals and/or applications. For example, within the frame structure, different TTI durations could be specified for a low latency mode, a low power mode, and/or a low overhead mode. Thus, various overhead/latency tradeoffs can be achieved through the use of dynamic TTI durations. For example, a lower latency access terminal or application may be allocated a shorter TTI in the frame structure. As another example, for access terminals or applications that require high performance or have a large amount of data to transfer, a longer TTI may be allocated in the frame structure. In this case, relative pilot and control overhead may be lower due to the use of the longer TTI.

The disclosure relates in some aspects to a control design that uses different types of control channels to support different access terminals and/or applications. Different control may be used, for example, and without limitation, for at least one of: different access terminals, different applications, or different modes of operation.

In some cases, the control design specifies a time division multiplexing (TDM) type of control channel. For example, this type of control channel may be used to enable fast control decoding to facilitate micro-sleep (psleep) and dynamic bandwidth (BW) switching for access terminals with lower power capabilities (e.g., due to limited battery power).

In some cases, the control design specifies a frequency division multiplexing (FDM) type of control channel. For example, this type of control channel may be used to enable an access terminal with narrowband (NB) processing capability to operate and hop within a wider band. This type of control channel also may be used to reduce scheduling latency.

The disclosure relates in some aspects to a control design that uses a code block (CB) level acknowledgement (ACK). The use of such an acknowledgement may enable more efficient multiplexing in scenarios involving, for example, both nominal access terminals and ultra-low-latency (e.g., mission critical) access terminals.

These and other aspects of the disclosure will now be described with reference to FIGS. 3-7. For purposes of illustration, these figures may illustrate various components in the context of 5G technology and/or LTE technology. It should be appreciated, however, that the teachings herein may employ other types of devices and be implemented using other types of radio technologies and architectures. Also, various operations may be described as being performed by specific types of components (e.g., eNBs, base stations, client devices, peer-to-peer devices, UEs, and so on). It should be understood that these operations can be performed by other types of devices. To reduce the complexity of these figures, only few example components are shown. However, the teachings herein can be implemented using a different number of components or other types of components.

Figure 3:
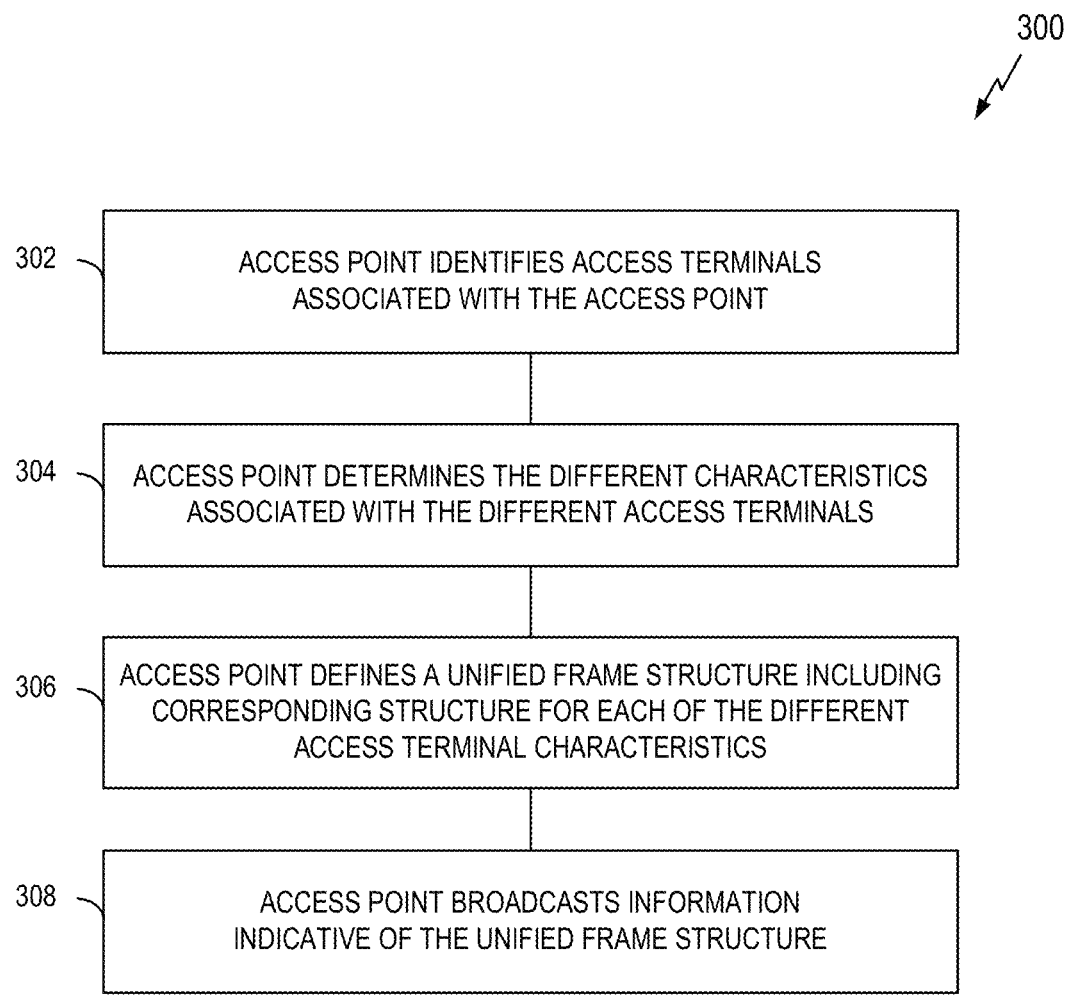
FIG. 3 is a flowchart illustrating an example of a process involving defining a frame structure in accordance with some aspects of the disclosure.
Figure 4:
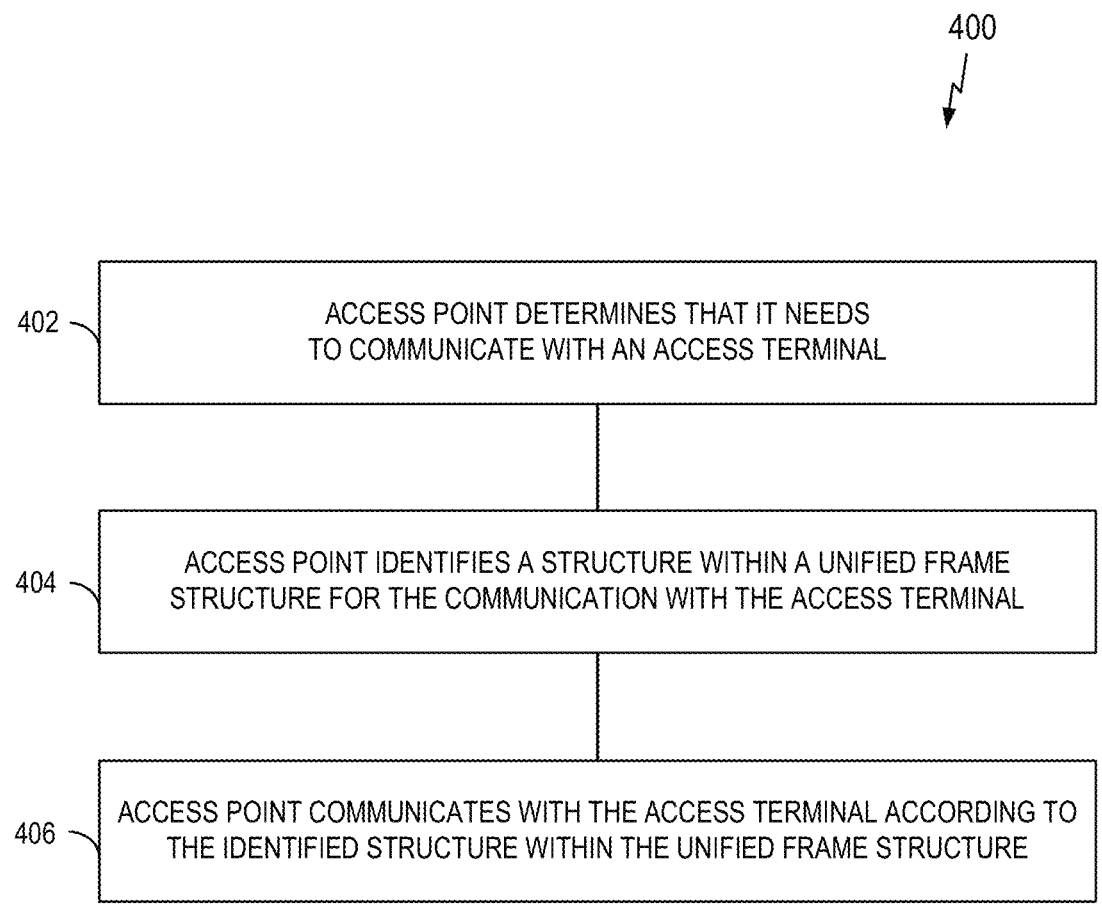
FIG. 4 is a flowchart illustrating an example of a process for communication using a frame structure in accordance with some aspects of the disclosure.
Figure 5:
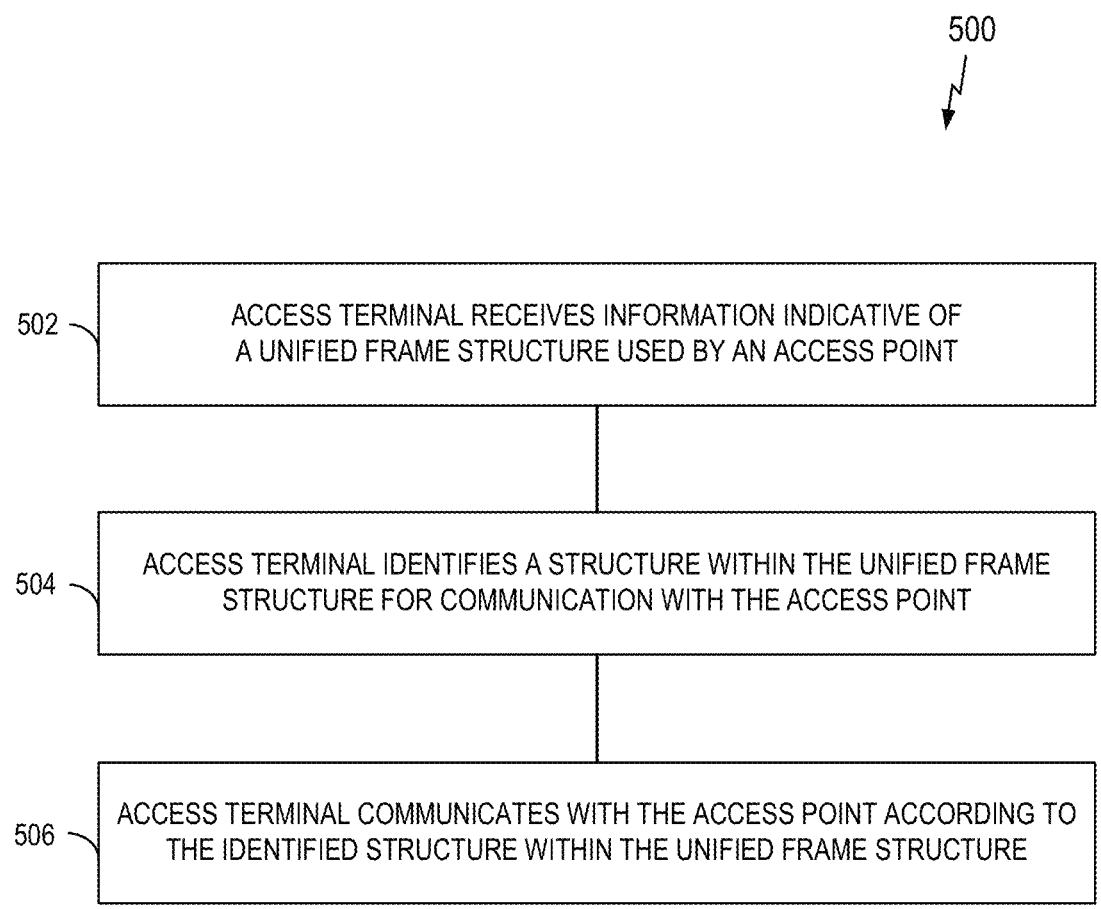
FIG. 5 is a flowchart illustrating another example of a process for communication using a frame structure in accordance with some aspects of the disclosure.

FIGS. 3-5 illustrate several operations that may be performed by an access point and an access terminal to define and use a unified frame structure. In particular, FIG. 3 describes operations by an access point to define the structures within a unified frame structure based on characteristics (e.g., performance requirements) of associated access terminals. FIG. 4 and FIG. 5 describe operations by an access point and an access terminal, respectively, relating to identifying the appropriate structure within the unified frame structure to be used for communication between the access point and the access terminal. In some aspects, such an access terminal may correspond to the AT 250 of FIG. 2, or any of the ATs 130, 132, 134, 136, 138, or 140 of FIG. 1. In some aspects, such an access point may correspond to the AP 210 of FIG. 2, or any of the APs 142, 144, or 146 of FIG. 1.

In general, FIGS. 3-5 involve communication employing a unified frame structure where different structures for different access requirements (e.g., different tiers of access terminal categories and applications) are multiplexed within the unified frame structure. In some aspects, the different access requirements include at least one of: different access terminals, different applications, different latency modes, different overhead modes, different power modes, different bandwidth modes, narrowband capability in a wideband environment, mission critical access, nominal access, ultra-low latency access, micro-sleep mode, and/or dynamic bandwidth switching.

FIG. 3 illustrates a process 300 for defining frame structure and control in accordance with some aspects of the disclosure. The process 300 may take place within a processing circuit (e.g., the controller/processor 240 of FIG. 2). Of course, in various aspects within the scope of the disclosure, the process 300 may be implemented by any suitable apparatus capable of supporting frame structure and control-related operations.

At block 302 of FIG. 3, an access point identifies any access terminals that are associated with the access point. For example, the access point may identify any access terminals that are currently connected to or camping on the access point.

At block 304, for each access terminal identified at block 302, the access point identifies one or more characteristics associated with the access terminal. In some aspects, these characteristics indicate different access requirements associated with the access terminals (e.g., different tiers of UE categories and/or applications). In some aspects, these characteristics indicate different performance requirements associated with the access terminals.

At block 306, the access point defines a unified frame structure to be used for communicating with the access terminals. This unified frame structure includes corresponding structure for each of the different access terminal characteristics determined at block 304.

Thus, in some aspects, the access point may define the unified frame structure according to different access requirements. Depending on the characteristics of a particular access terminal or associated application (e.g., a low power UE or a low latency application), structure (e.g., TTI length, type of control channel, etc.) within the unified frame structure can be defined to best accommodate those characteristics. For example, the structure (e.g., TTI and control structure) corresponding to a low latency application may be identified in the event the access point needs to communicate (e.g., transmit and/or receive) information for the low latency application.

At block 308, the access point broadcasts information indicative of the unified frame structure (e.g., on a broadcast channel). In this way, the access terminals identified at block 302 can identify the frame structure being used by the access point.

FIG. 4 illustrates a process 400 for using frame structure and control in accordance with some aspects of the disclosure. The process 400 may take place within a processing circuit (e.g., the controller/processor 240 of FIG. 2). Of course, in various aspects within the scope of the disclosure, the process 400 may be implemented by any suitable apparatus capable of supporting frame structure and control-related operations.

At block 402 of FIG. 4, an access point determines that it needs to communicate with an access terminal. For example, the access point may receive data destined for the access terminal or may receive a message from the access terminal on a random access channel.

At block 404, the access point identifies a structure within a unified frame structure (e.g., defined by the process 300 of FIG. 3) to be used for communicating with the access terminal. To this end, the access point may determine the characteristics (e.g., performance requirements) of the access terminal and thereby determine the structure within the unified frame structure that corresponds to those characteristics.

At block 406, the access point communicates with the access terminal according to the identified structure within the unified frame structure. For example, the access point may communicate over the TTIs and frequency bands specified by the structure identified at block 404.

FIG. 5 illustrates a process 500 for using frame structure and control in accordance with some aspects of the disclosure. The process 500 may take place within a processing circuit (e.g., the controller/processor 290 of FIG. 2). Of course, in various aspects within the scope of the disclosure, the process 500 may be implemented by any suitable apparatus capable of supporting frame structure and control-related operations.

At block 502 of FIG. 5, an access terminal receives information indicative of a unified frame structure used by an access point. For example, the access terminal can receive the information broadcast by the access point at block 308 of FIG. 3.

At block 504, the access terminal identifies a structure within the unified frame structure for communication with the access point. For example, in the event the access terminal needs to communicate (e.g., transmit and/or receive) information for a low latency application running on the access terminal, the access terminal may identify the structure (e.g., TTI and control structure) within the unified frame structure corresponding to that low latency application.

At block 506, the access terminal communicates with the access point according to identified structure within the unified frame structure. For example, if the access terminal is a low power access terminal, the access terminal may use a low power structure (e.g., shortened TTIs and narrowband control channel) defined within the unified frame structure for the communication.

Example Frame Structure

Figure 6:
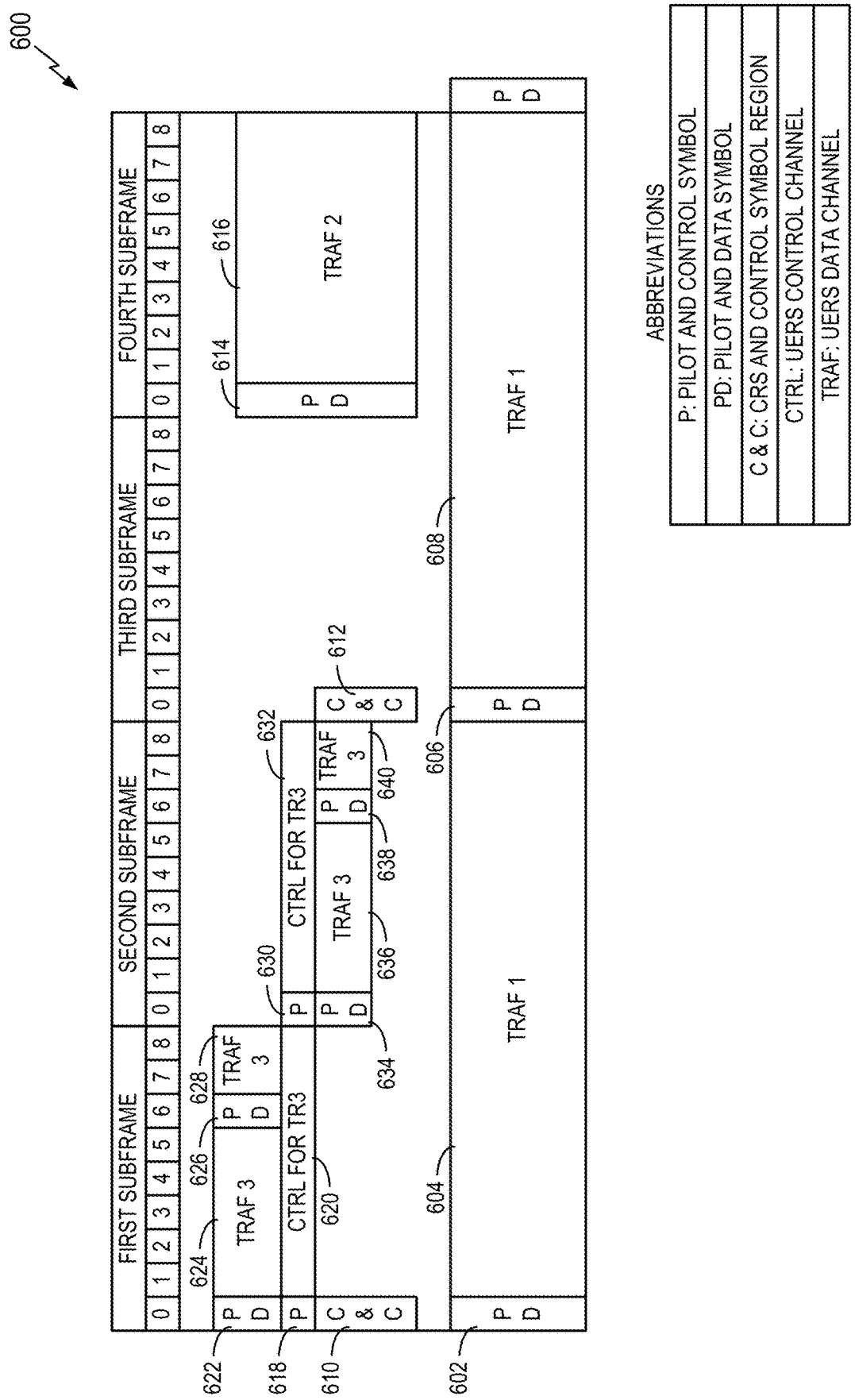
FIG. 6 illustrates an example of a frame structure in accordance with some aspects of the disclosure.

FIG. 6 illustrates an example of a frame structure 600 (e.g., a unified framework) to support multiple access requirements in accordance with the teachings herein. The frame structure 600 supports the use of flexible TTI lengths, flexible pilots, and/or flexible control overhead to achieve a desired tradeoff between latency, power, and memory usage. For example, different TTI lengths could be specified for different users, applications, etc. As used herein, the term shortened TTI refers to a TTI that is shorter than another TTI (e.g., a standard length TTI) used by the apparatus or used in an associated wireless communication network. Also as used herein, the term lengthened TTI refers to a TTI that is longer than another TTI (e.g., a standard length TTI) used by the apparatus or used in an associated wireless communication network.

The quantities and dimensions used in FIG. 6 are for purposes of illustration only. Other implementations could use other timing, bandwidth, and allocations.

The abbreviations that follow are used in the figure. P represents at least one pilot and control symbol. PD represents at least one pilot and data symbol. C & C represent at least one cell-specific reference signal (CRS) and control symbol region. CTRL represents at least one UE reference signal (UERS) control channel TRAF [1, 2, or 3] represents at least one UERS data channel Low Overhead Mode An example of a low overhead mode (e.g., a low overhead access) is shown with reference to TRAF 1 (UERS Traffic1) in FIG. 6. In some aspects, a low overhead mode (e.g., a low overhead mode of operation) may be associated with a low overhead access (e.g., a low overhead communication access).

A first pilot and data symbol 602 in slot 0 of the first subframe precedes a first UERS data channel 604 in the first and second subframes. In addition, a second pilot and data symbol 606 in slot 0 of the third subframe precedes a second UERS data channel 608 in the third and fourth subframes.

This mode may thus involve a relatively long TTI (two subframes in the example of FIG. 6), relatively low overhead (e.g., relative to the amount of data transmitted), and relatively high performance (e.g., large data transfers and/or high throughput). Moreover, in some scenarios, cross-TTI pilot filtering may be employed in this mode (e.g., so the pilot density is lower over time).

As discussed in more detail below in conjunction with FIG. 7, the low overhead traffic could be overwritten by low latency traffic. In this case, low overhead traffic would skip a particular TTI if an indicator channel indicates that the particular prescheduled TTI is overwritten.

Low overhead mode can be used for UEs that support large data volume. Such UEs may be, for example, less delay sensitive and/or tend to have a full buffer. In this example, the TTI could be selected to be relatively long (e.g., 1 millisecond) with less pilot overhead per TTI, and cross TTI pilot filtering (e.g., using pilots from multiple TTIs for channel estimation) enabled. Such a mode can have relatively low pilot overhead and good performance with moderate latency. In some implementations, the UE decodes the control information every TTI duty cycle to save power. That is, the control information may be decoded less frequently in this case. Meanwhile, as mentioned above, a low overhead mode UE may need to decode an indicator channel per TTI during a scheduled traffic period to monitor an overwrite indicator, and thereby determine whether to skip a particular TTI.

As used herein, the term low overhead mode refers to a mode of operation that is associated with lower overhead (e.g., communication overhead) than another mode of operation (e.g., a high overhead mode) used by the apparatus or used in an associated wireless communication network. Also as used herein, the term low overhead access refers to an access operation (e.g., accessing a wireless communication resource) that is associated with lower overhead than another access operation (e.g., a high overhead access) used by the apparatus or used in an associated wireless communication network.

Other implementations of a low overhead mode or a low overhead access might involve only of subset of the factors discussed above. Also, other implementations of a low overhead mode or a low overhead access might involve other factors.

Low Power Mode

An example of a low power mode is shown with reference to TRAF 2 (UERS Traffic2) in FIG. 6. In some aspects, a low power mode (e.g., a low power mode of operation) may be associated with a low power access (e.g., a low power communication access).

A first CRS and CTRL symbol region 610 is at slot 0 of the first subframe and a second CRS and CTRL symbol region 612 is at slot 0 of the third subframe. A pilot and data symbol 614 precedes a UERS data channel 616 in the fourth subframe.

This mode may involve the use of a common reference signal (RS) and control for wakeup and decode operations, whereby traffic is scheduled in the TTI that follows the RS and control. For example, a UE may wake up and, in narrowband, only decode the TDM pilots (e.g., CRS & CTRL). As indicated in FIG. 6, this control area may be narrow both in terms of time and frequency. See the second CRS and CTRL symbol region 612. If there is no grant for the UE, the UE may therefore go quickly back to sleep to save power. If there is a grant, the UE may open up its radio frequency (RF) band for wideband communication during the next TTI (e.g., to receive the pilot and data symbol 614 and the UERS data channel 616).

The low power (e.g., low amplitude) mode may be advantageous for psleep. Here, a UE may decode control information in a TDM and narrowband (NB) common-RS based control region for fast control decoding. To save power, the UE may go back to psleep if no grant is decoded.

The low power mode may be advantageous for dynamic bandwidth switching. A UE may decode control information in a center narrowband region. Then, when a grant is decoded, the UE may open up the wideband RF for data demodulation. The data channel can be scheduled later (e.g., one TTI later) than the control channel to reserve time for RF switching.

As used herein, the term low power mode refers to a mode of operation that is associated with lower power consumption than another mode of operation (e.g., a high power mode) used by the apparatus or used in an associated wireless communication network. Also as used herein, the term low power access refers to an access operation (e.g., accessing a wireless communication resource) that is associated with lower power consumption than another access operation (e.g., a high power access) used by the apparatus or used in an associated wireless communication network. Also as used herein, the term micro-sleep mode refers to a mode of operation that is associated with lower power consumption than a low power mode of operation used by the apparatus or used in an associated wireless communication network.

Other implementations of a low power mode, a low power access, or a micro-sleep mode might involve only a subset of the above factors. Also, other implementations of a low power mode, a low power access, or a micro-sleep mode might involve other factors.

Low Latency Mode

An example of a low latency mode is shown with reference to TRAF 3 (UERS Traffic3) in FIG. 6. In some aspects, a low latency mode (e.g., a low latency mode of operation) may be associated with a low latency access (e.g., a low latency communication access).

In the first subframe, a first pilot and control symbol 618 in slot 0 precedes a first UERS control channel 620. In addition, a first pilot and data symbol 622 in slot 0 precedes a first UERS data channel 604, while a second pilot and data symbol 626 in slot 6 precedes a second UERS data channel 628.

In the second subframe, a second pilot and control symbol 630 in slot 0 precedes a second UERS control channel 632. In addition, a third pilot and data symbol 634 in slot 0 precedes a third UERS data channel 636, while a fourth pilot and data symbol 638 in slot 6 precedes a fourth UERS data channel 640.

As indicted, shorter TTIs are used in this mode. In addition, a control channel can be staggered across TTIs as shown to reduce decoding latency.

This mode may involve per-TTI control grant and ACK/NAK feedback. In an example of a low latency mode, a UE may monitor control and data per TTI to decode delay-sensitive data. Such a low latency mode could be used, for example, if the decoding latency requirement is very low.

As used herein, the term low latency mode refers to a mode of operation that is associated with lower latency (e.g., communication latency) than another mode of operation (e.g., a high latency mode) used by the apparatus or used in an associated wireless communication network. Also as used herein, the term low latency access refers to an access operation (e.g., accessing a wireless communication resource) that is associated with lower latency than another access operation (e.g., a high latency access) used by the apparatus or used in an associated wireless communication network.

Other implementations of a low latency mode or a low latency access might involve only a subset of these factors. Also, other implementations of a low latency mode or a low latency access might involve other factors.

Bandwidth Management

The disclosure also relates in some aspects to flexible (e.g., dynamic) bandwidth management. For example, a low latency mode may support narrowband processing, whereby a UE is allowed to operate within a relatively large section of bandwidth, even though the UE only uses a portion of the bandwidth at a time (e.g., the UE could hop between different frequency bands from one TTI to the next). In this case, the control processing can be narrowband as well. A narrowband (NB) UE mode may thus employ TRAF 3 whereby narrowband UEs with limited radio frequency (RF) capability can share a chunk of a relatively large bandwidth. In addition, through the use of TRAF 3, the use of low power UEs with dynamic wideband/narrowband (WB/NB) bandwidth switching capability is enabled.

In an example of a narrowband mode UE, the UE is configured to decode control and data in a dedicated bandwidth of an entire wide band. The UE may hop to another carrier frequency to decode control and/or data in response to a request or an eNB configuration. Demodulation reference signal (DMRS)-based control may be used to ensure localized NB processing of control, as well as reduced pilot overhead. The control channel could be staggered across TTIs to allow for data and control pipelining, and to reduce buffering requirements. The narrowband control/data mode thus allows a UE with narrowband RF capability to share a chunk of bandwidth from a much wider bandwidth.

As used herein, the term narrowband refers to a radio frequency (RF) band that is narrower than another band (e.g., a wideband) used by the apparatus or used in an associated wireless communication network. As used herein, the term narrowband mode refers to a mode of operation that is associated with a narrower bandwidth (e.g., communication bandwidth) than another mode of operation (e.g., a wideband mode) used by the apparatus or used in an associated wireless communication network. Also as used herein, the term narrowband access refers to an access operation (e.g., accessing a wireless communication resource) that is associated with narrower bandwidth than another access operation (e.g., a wideband access) used by the apparatus or used in an associated wireless communication network.

Mission-Critical Traffic

The disclosure also relates in some aspect to multiplexing of nominal traffic and ultra-low latency (e.g., mission critical) traffic. To schedule ultra-low-latency traffic in the desired manner, nominal traffic may be punctured if needed. That is, ultra-low-latency traffic may take priority over other traffic. In some scenarios, mission-critical traffic is traffic that has to be fast and ultra-reliable. Types of mission-critical traffic could be virtual surgeries, automobile traffic control (e.g., traffic grid), and autonomous control over objects (e.g., autonomous automobiles, drone-type air vehicles, and/or other types of autonomous control systems using wireless communication).

Figure 7:
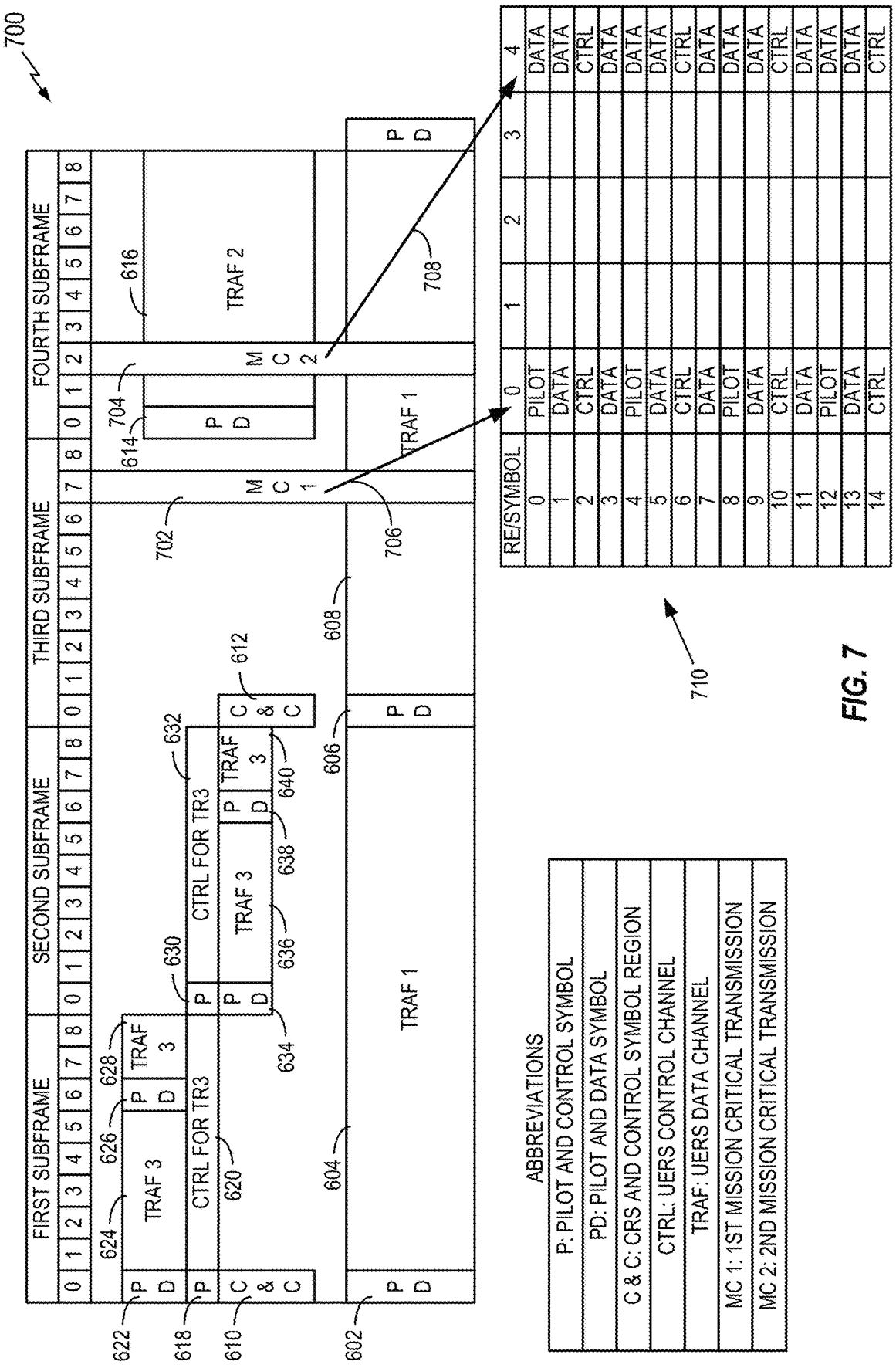
FIG. 7 illustrates an example of traffic multiplexing in accordance with some aspects of the disclosure.

The frame structure 700 of FIG. 7 illustrates an example of nominal traffic and ultra-low latency (e.g., mission critical) traffic multiplexing. Here, a first mission critical transmission 702 is allowed to be scheduled over the entirety of the bandwidth (the y axis in FIG. 7) for one timeslot, if needed. A second mission critical transmission 704 also can be scheduled over the entirety of the bandwidth for another timeslot, if needed. As indicated by the first arrow 706 and the second arrow 708 corresponding to the first mission critical transmission 702 and the second mission critical transmission 704, respectively, the TTI for the second UERS data channel 608 (e.g., nominal traffic) has been punctured to schedule the mission critical traffic indicated in the table 710.

As used herein, the term ultra-low latency mode refers to a mode of operation that is associated with lower latency (e.g., communication latency) than a low latency mode of operation used by the apparatus or used in an associated wireless communication network.

Block Acknowledgments

In some implementations, a code block (CB)-level ACK (e.g., as opposed to a transport block-level ACK) is used to ensure efficient recovery of nominal UE punctured data. For example, if only a code block has been punctured, a code block level NAK can be sent to indicate that the code block is in error. Thus, a code block can be retransmitted instead of the entire transport block, thereby improving the efficiency of the ACK process.

Example Apparatus

Figure 8:
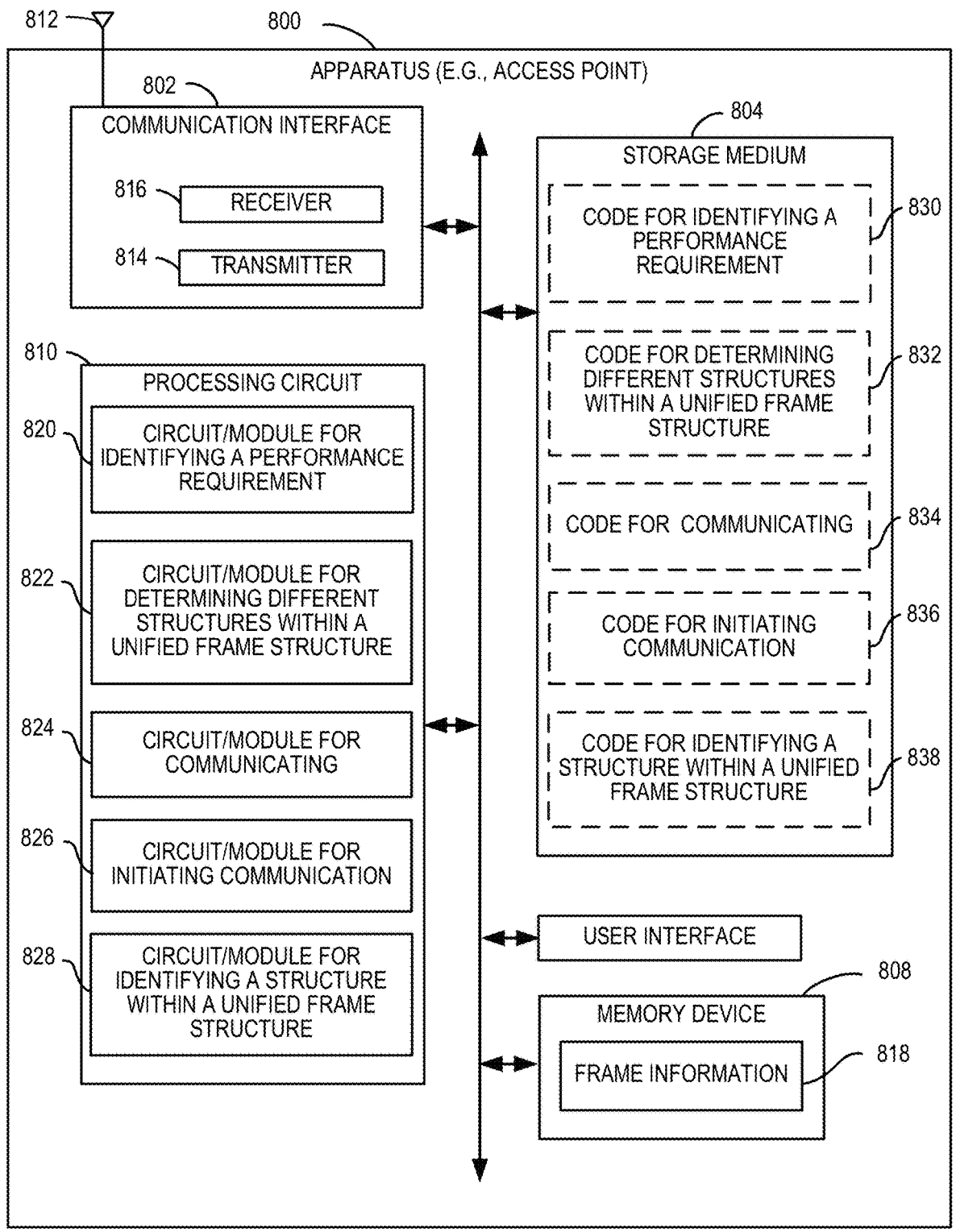
FIG. 8 is a block diagram illustrating an example hardware implementation for an apparatus (e.g., an electronic device) that can execute one or more of the disclosed communication processes (e.g., relating to frame structure and control design) in accordance with some aspects of the disclosure.

FIG. 8 illustrates a block diagram of an example hardware implementation of an apparatus 800 configured to communicate according to one or more aspects of the disclosure. For example, the apparatus 800 could embody or be implemented within a base station (e.g., an eNB), a UE, or some other type of device that supports wireless communication. In various implementations, the apparatus 800 could embody or be implemented within an access terminal, an access point, or some other type of device. In various implementations, the apparatus 800 could embody or be implemented within a mobile phone, a smart phone, a tablet, a portable computer, a server, a personal computer, a sensor, an entertainment device, a medical device, or any other electronic device having circuitry.

The apparatus 800 includes a communication interface (e.g., at least one transceiver) 802, a storage medium 804, a user interface 806, a memory device (e.g., a memory circuit) 808, and a processing circuit (e.g., at least one processor) 810. In various implementations, the user interface 806 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 8. The signaling bus may include any number of interconnecting buses and bridges depending on the specific application of the processing circuit 810 and the overall design constraints. The signaling bus links together various circuits such that each of the communication interface 802, the storage medium 804, the user interface 806, and the memory device 808 are coupled to and/or in electrical communication with the processing circuit 810. The signaling bus may also link various other circuits (not shown) such as timing sources, peripherals, voltage regulators, and power management circuits, which are well known in the art, and therefore, will not be described any further.

The communication interface 802 includes circuitry for communicating with other apparatuses over a transmission medium. In some implementations, the communication interface 802 includes circuitry and/or programming adapted to facilitate the communication of information bi-directionally with respect to one or more communication devices in a network. In some implementations, the communication interface 802 is adapted to facilitate wireless communication of the apparatus 800. In these implementations, the communication interface 802 may be coupled to one or more antennas 812 as shown in FIG. 8 for wireless communication within a wireless communication system. The communication interface 802 can be configured with one or more standalone receivers and/or transmitters, as well as one or more transceivers. In the illustrated example, the communication interface 802 includes a transmitter 814 and a receiver 816. The communication interface 802 serves as one example of a means for receiving and/or means transmitting.

The memory device 808 may represent one or more memory devices. As indicated, the memory device 808 may maintain frame-related information 818 along with other information used by the apparatus 800. In some implementations, the memory device 808 and the storage medium 804 are implemented as a common memory component. The memory device 808 may also be used for storing data that is manipulated by the processing circuit 810 or some other component of the apparatus 800.

The storage medium 804 may represent one or more computer-readable, machine-readable, and/or processor-readable devices for storing programming, such as processor executable code or instructions (e.g., software, firmware), electronic data, databases, or other digital information. The storage medium 804 may also be used for storing data that is manipulated by the processing circuit 810 when executing programming. The storage medium 804 may be any available media that can be accessed by a general purpose or special purpose processor, including portable or fixed storage devices, optical storage devices, and various other mediums capable of storing, containing or carrying programming.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium.

The storage medium 804 may be coupled to the processing circuit 810 such that the processing circuit 810 can read information from, and write information to, the storage medium 804. That is, the storage medium 804 can be coupled to the processing circuit 810 so that the storage medium 804 is at least accessible by the processing circuit 810, including examples where at least one storage medium is integral to the processing circuit 810 and/or examples where at least one storage medium is separate from the processing circuit 810 (e.g., resident in the apparatus 800, external to the apparatus 800, distributed across multiple entities, etc.).

Programming stored by the storage medium 804, when executed by the processing circuit 810, causes the processing circuit 810 to perform one or more of the various functions and/or process operations described herein. For example, the storage medium 804 may include operations configured for regulating operations at one or more hardware blocks of the processing circuit 810, as well as to utilize the communication interface 802 for wireless communication utilizing their respective communication protocols.

The processing circuit 810 is generally adapted for processing, including the execution of such programming stored on the storage medium 804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 810 is arranged to obtain, process and/or send data, control data access and storage, issue commands, and control other desired operations. The processing circuit 810 may include circuitry configured to implement desired programming provided by appropriate media in at least one example. For example, the processing circuit 810 may be implemented as one or more processors, one or more controllers, and/or other structure configured to execute executable programming Examples of the processing circuit 810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 810 are for illustration and other suitable configurations within the scope of the disclosure are also contemplated.

According to one or more aspects of the disclosure, the processing circuit 810 may be adapted to perform any or all of the features, processes, functions, operations and/or routines for any or all of the apparatuses described herein. For example, the processing circuit 810 may be configured to perform any of the steps, functions, and/or processes described with respect to FIGS. 1-7 and 9-12. As used herein, the term "adapted" in relation to the processing circuit 810 may refer to the processing circuit 810 being one or more of configured, employed, implemented, and/or programmed to perform a particular process, function, operation and/or routine according to various features described herein.

The processing circuit 810 may be a specialized processor, such as an application specific integrated circuit (ASIC) that serves as a means for (e.g., structure for) carrying out any one of the operations described in conjunction with FIGS. 1-7 and 9-12. The processing circuit 810 serves as one example of a means for transmitting and/or a means for receiving. In some implementations, the processing circuit 810 incorporates the functionality of the controller/processor 240 of FIG. 2.

According to at least one example of the apparatus 800, the processing circuit 810 may include one or more of a circuit/module for identifying a performance requirement 820, a circuit/module for determining different structures within a unified frame structure 822, a circuit/module for communicating 824, a circuit/module for initiating communication 826, or a circuit/module for identifying a structure within a unified frame structure 828. In some implementations, the circuit/module for identifying a performance requirement 820, the circuit/module for determining different structures within a unified frame structure 822, the circuit/module for communicating 824, the circuit/module for initiating communication 826, and the circuit/module for identifying a structure within a unified frame structure 828 correspond, at least in part, to the controller/processor 240 of FIG. 2.

The circuit/module for identifying a performance requirement 820 may include circuitry and/or programming (e.g., code for identifying a performance requirement 830 stored on the storage medium 804) adapted to perform several functions relating to, for example, for each of a plurality of apparatuses (e.g., UEs), identifying a performance requirement for the apparatus. Initially, the circuit/module for identifying a performance requirement 820 identifies an apparatus with which communication will be established. For example, the circuit/module for identifying a performance requirement 820 may receive an identifier of an apparatus with which the apparatus 800 will be communicating. The circuit/module for identifying a performance requirement 820 then obtains information regarding a performance requirement for that apparatus from a component of the apparatus 800 (e.g., from the memory device 808, the communication interface 802, or some other component) or directly from an entity that maintains the information. In some implementations, the circuit/module for identifying a performance requirement 820 obtains this information from the apparatus itself (e.g., via over-the-air signaling). In some implementations, the circuit/module for identifying a performance requirement 820 obtains this information from a database (e.g., a network database or a database local to the apparatus 800). Finally, the circuit/module for identifying a performance requirement 820 outputs an indication of the identified performance requirement to a component of the apparatus 800 (e.g., the memory device 808, the circuit/module for determining different structures within a unified frame structure 822, or some other component).

The circuit/module for determining different structures within a unified frame structure 822 may include circuitry and/or programming (e.g., code for determining different structures within a unified frame structure 832 stored on the storage medium 804) adapted to perform several functions relating to, for example, determining different structures within a unified frame structure for communication (e.g., with a plurality of apparatuses (e.g., UEs)). In some aspects, the circuit/module for determining different structures within a unified frame structure 822 determines a particular one of these frames structures based on the performance requirement for a corresponding one of the apparatuses. Initially, the circuit/module for determining different structures within a unified frame structure 822 obtains the corresponding performance requirement for each of the apparatuses (e.g., from the memory device 808, the circuit/module for identifying a performance requirement 820, or some other component). The circuit/module for determining different structures within a unified frame structure 822 then identifies, for each performance requirement, a corresponding structure within a unified frame structure as discussed herein. Finally, the circuit/module for determining different structures within a unified frame structure 822 outputs an indication of a unified frame structure that includes the different structures to a component of the apparatus 800 (e.g., the memory device 808, the circuit/module for communicating 824, the communication interface 802, or some other component).

The circuit/module for communicating 824 may include circuitry and/or programming (e.g., code for communicating 834 stored on the storage medium 804) adapted to perform several functions relating to, for example, communicating (e.g., sending and/or receiving via a transceiver) information. In some implementations, the communication interface 802 includes the circuit/module for communicating 824 and/or the code for communicating 834.

In some implementations, the communicating involves the circuit/module for communicating 824 receiving information from a component of the apparatus 800 (e.g., the receiver 816, the memory device 808, or some other component) or receiving information directly from a device that transmitted the information. In this case, the circuit/module for communicating 824 may process (e.g., decode) the received information. The circuit/module for communicating 824 then outputs the received information to a component of the apparatus 800 (e.g., the memory device 808 or some other component).

In some implementations, the communicating involves sending information to another component of the apparatus 800 (e.g., the transmitter 814) for transmission to another device or sending information directly to an ultimate destination (e.g., if the circuit/module for communicating 824 includes a transmitter). In this case, the circuit/module for communicating 824 initially obtains information to be communicated. The circuit/module for communicating 824 may process (e.g., encode) the information to be transmitted. The circuit/module for communicating 824 then causes the information to be transmitted. For example, the circuit/module for communicating 824 can directly transmit the information or pass the information to the transmitter 814 for subsequent radio frequency (RF) transmission.

In some implementations, the circuit/module for communicating 824 communicates (e.g., sends) an indication of a unified frame structure. In this case, the circuit/module for communicating 824 obtains the indication from the memory device 808, the circuit/module for determining different structures within a unified frame structure 822, or some other component. The circuit/module for communicating 824 then causes the indication to be transmitted (e.g., as discussed herein).

In some implementations, the circuit/module for communicating 824 communicates (e.g., sends information and/or receives information) according to an identified structure within the unified frame structure. Initially, the circuit/module for communicating 824 obtains information about the identified structure within the unified frame structure (e.g., from the memory device 808, the circuit/module for identifying a structure within a unified frame structure 828, or some other component). In some scenarios, the circuit/module for communicating 824 extracts information from a received frame, where the received frame employs the uniform frame structure and includes the identified structure. In this case, the circuit/module for communicating 824 locates the identified structure within the unified frame structure and extracts the information carried by that structure. In some scenarios, the circuit/module for communicating 824 sends information via a frame that employs the uniform frame structure and includes the identified structure. In this case, the circuit/module for communicating 824 locates the identified structure within the unified frame structure and causes the information to be sent via the identified structure.

In some implementations, the circuit/module for communicating 824 communicates (e.g., receives) a code block-level acknowledgement of a nominal access terminal (e.g., a first UE) that is in coexistence with a particular apparatus (e.g., a second UE). In some scenarios, the communication of such an acknowledgement is indicated by a determination that the performance requirement for the particular apparatus is mission critical access (e.g., as determined by the circuit/module for identifying a performance requirement 820). The circuit/module for communicating 824 obtains the acknowledgement information directly from an entity that transmitted the acknowledgement or from a component of the apparatus 800 (e.g., the receiver 816, the memory device 808, or some other component). The circuit/module for communicating 824 may process (e.g., decode) the received acknowledgement information. The circuit/module for communicating 824 then outputs an indication of the acknowledgement to a component of the apparatus 800 (e.g., the memory device 808 or some other component).

In some implementations, the circuit/module for communicating 824 communicates (e.g., sends) an indication that pilots from different transmission time intervals (TTIs) are to be used for channel estimation for communication with a particular apparatus. In some scenarios, the communication of such an indication is triggered by a determination that the performance requirement for the particular apparatus is low overhead access (e.g., as determined by the circuit/module for identifying a performance requirement 820). The circuit/module for communicating 824 generates the indication or obtains the indication from a component of the apparatus 800 (e.g., the memory device 808 or some other component). The circuit/module for communicating 824 may process (e.g., encode) the indication. The circuit/module for communicating 824 then causes the indication to be transmitted (e.g., as discussed herein).

The circuit/module for initiating communication 826 may include circuitry and/or programming (e.g., code for initiating communication 836 stored on the storage medium 2204) adapted to perform several functions relating to, for example, initiating communication with a particular apparatus (e.g., a UE). In some implementations, the circuit/module for initiating communication 826 conducts preliminary communication operations with the particular apparatus to establish communication with the apparatus. In some scenarios, the circuit/module for initiating communication 826 receives an initial message from the particular apparatus on a discovery channel or some other channel to initiate the communication. The circuit/module for initiating communication 826 may then send a response to this message indicating whether the communication can be established. In conjunction with this initial communication, one or more parameters for the communication may be negotiated between the circuit/module for initiating communication 826 and the particular apparatus. In some scenarios, the circuit/module for initiating communication 826 sends an initial message to the particular apparatus to initiate the communication. In any event, the circuit/module for initiating communication 826 outputs an indication of whether the communication has been initiated to a component of the apparatus 800 (e.g., the memory device 808, the circuit/ module for identifying a structure within a unified frame structure 828, or some other component). In some implementations, the communication interface 802 includes the circuit/module for initiating communication 826 and/or the code for initiating communication 836.

The circuit/module for identifying a structure within a unified frame structure 828 may include circuitry and/or programming (e.g., code for identifying a structure within a unified frame structure 838 stored on the storage medium 804) adapted to perform several functions relating to, for example, identifying a particular structure within the unified frame structure for communication with a particular apparatus based on a corresponding performance requirement for the particular apparatus. Initially, the circuit/module for identifying a structure within a unified frame structure 828 obtains an indication of the performance requirement for the particular apparatus (e.g., from the memory device 808, the circuit/module for identifying a performance requirement 820, or some other component). The circuit/module for identifying a structure within a unified frame structure 828 then identifies, based on the performance requirement, a corresponding structure within a unified frame structure as discussed herein. Finally, the circuit/module for identifying a structure within a unified frame structure 828 outputs an indication of the identified structure to a component of the apparatus 800 (e.g., the memory device 808, the circuit/module for communicating 824, the communication interface 802, or some other component).

As mentioned above, programming stored by the storage medium 804, when executed by the processing circuit 810, causes the processing circuit 810 to perform one or more of the various functions and/or process operations described herein. For example, the programming, when executed by the processing circuit 810, may cause the processing circuit 810 to perform the various functions, steps, and/or processes described herein with respect to FIGS. 1-7 and 9-12 in various implementations. As shown in FIG. 8, the storage medium 804 may include one or more of the code for identifying a performance requirement 830, the code for determining different structures within a unified frame structure 832, the code for communicating 834, the code for initiating communication 836, or the code for identifying a structure within a unified frame structure 838.

Example Processes

Figure 9:
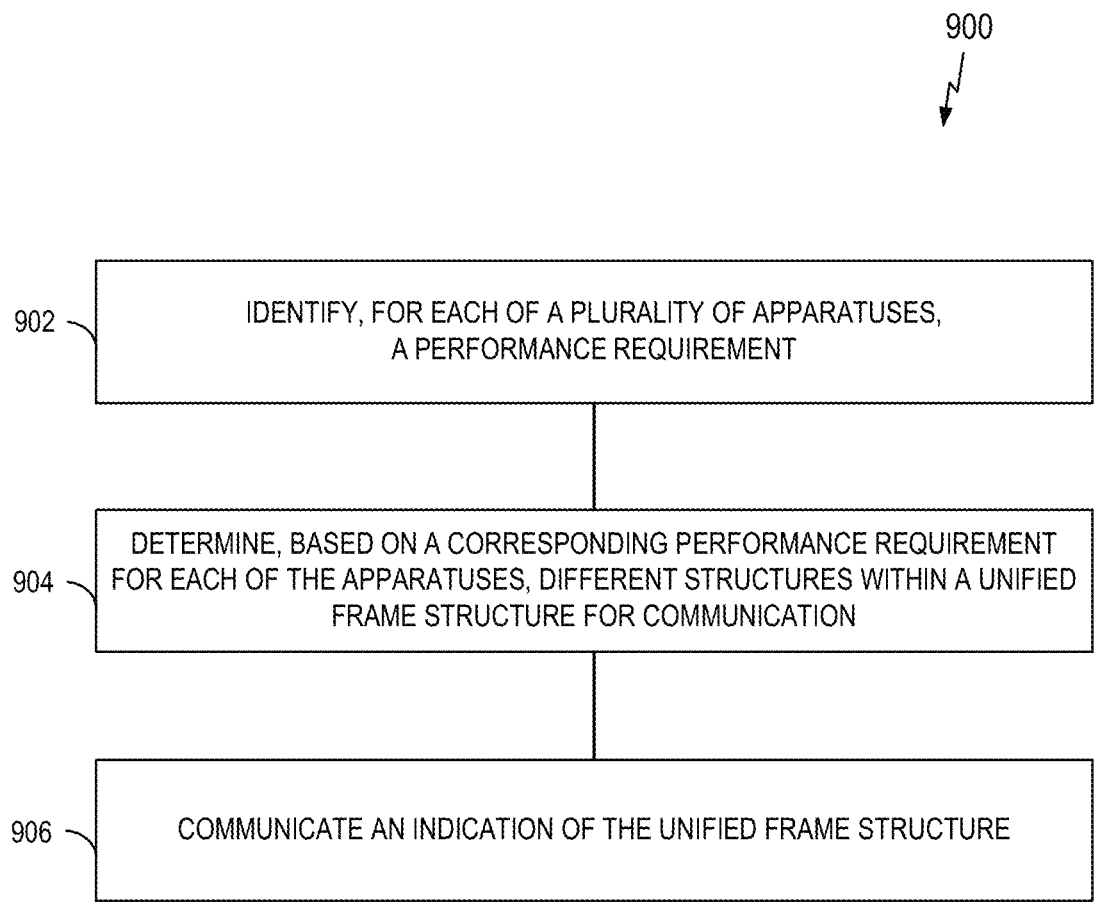
FIG. 9 is a flowchart illustrating an example of a process for communication in accordance with some aspects of the disclosure.

FIG. 9 illustrates a process 900 for communication in accordance with some aspects of the disclosure. The process 900 may take place within a processing circuit (e.g., the processing circuit 810 of FIG. 8), which may be located in a base station, an access terminal, or some other suitable apparatus. In some implementations, the process 900 represents operations performed by the controller/processor 240 of FIG. 2. Of course, in various aspects within the scope of the disclosure, the process 900 may be implemented by any suitable apparatus capable of supporting communication-related operations.

At block 902, a first apparatus (e.g., an access point) identifies, for each of a plurality of second apparatuses (e.g., other wireless communication apparatuses), a performance requirement for the second apparatus. For example, an access point may identify a first performance requirement associated with a first access terminal, a second performance requirement associated with a second access terminal, a third performance requirement associated with a third access terminal, and so on. In different scenarios, the plurality of second apparatuses may consist of all or a subset of the access terminals in the vicinity of the access point.

In some implementations, the circuit/module for identifying a performance requirement 820 of FIG. 8 performs the operations of block 902. In some implementations, the code for identifying a performance requirement 830 of FIG. 8 is executed to perform the operations of block 902.

At block 904, the first apparatus determines, based on a corresponding performance requirement for each of the second apparatuses, different structures within a unified frame structure for communication (e.g., with the second apparatuses). For example, an access point may define a first structure for a first performance requirement, a second structure for a second performance requirement, a third structure for a third performance requirement, and so on.

In some aspects, the different structures include at least one of: different transmission time intervals (TTIs), different frequency bands, or different control structures.

In some aspects, the different control structures include a time division multiplexing control channel structure and a frequency division multiplexing control channel structure. Here, the time division multiplexing control channel structure may be for low power access and/or dynamic bandwidth switching. Also, the frequency division multiplexing control channel structure may be for narrowband access and/or low latency access.

In some scenarios, the determined structure may include a lengthened transmission time interval (TTI). For example, for a particular apparatus of the plurality of apparatuses, a determined structure for the particular apparatus may include a lengthened TTI if the corresponding performance requirement for the particular apparatus includes low overhead access.

In some scenarios, the determined structure may include a time division multiplexed (TDM) control channel. For example, for a particular apparatus of the plurality of apparatuses, a determined structure for the particular apparatus may include a TDM control channel if the corresponding performance requirement for the particular apparatus includes low power access.

In some scenarios, the determined structure may include a narrowband control channel. For example, for a particular apparatus of the plurality of apparatuses, a determined structure for the particular apparatus may include a narrowband control channel if the corresponding performance requirement for the particular apparatus includes low power access.

In some scenarios, the determined structure may include a shortened transmission time interval (TTI). For example, for a particular apparatus of the plurality of apparatuses, a determined structure for the particular apparatus may include a shortened TTI if the corresponding performance requirement for the particular apparatus includes low latency access.

In some scenarios, the determined structure may include a control channel spread across transmission time intervals (TTIs). For example, for a particular apparatus of the plurality of apparatuses, a determined structure for the particular apparatus may include a control channel spread across TTIs if the corresponding performance requirement for the particular apparatus includes low latency access.

In some scenarios, the determined structure may include a narrowband control channel. For example, for a particular apparatus of the plurality of apparatuses, a determined structure for the particular apparatus may include a narrowband control channel if the corresponding performance requirement for the particular apparatus includes dynamic bandwidth switching.

In some aspects, the apparatus determines the different structures based on at least one of: different applications associated with the second apparatuses, different bandwidth modes associated with the second apparatuses, narrowband capability in a wideband environment associated with the second apparatuses, micro-sleep mode associated with the second apparatuses, or dynamic bandwidth switching associated with the second apparatuses.

In some implementations, the circuit/module for determining different structures within a unified frame structure 822 of FIG. 8 performs the operations of block 904. In some implementations, the code for determining different structures within a unified frame structure 832 of FIG. 8 is executed to perform the operations of block 904.

At block 906, the first apparatus communicates an indication of the unified frame structure. For example, an access point may broadcast the indication on a broadcast channel. In some aspects, the communication may be via a communication interface.

In some implementations, the circuit/module for communicating 824 of FIG. 8 performs the operations of block 906. In some implementations, the code for communicating 834 of FIG. 8 is executed to perform the operations of block 906.

Figure 10:
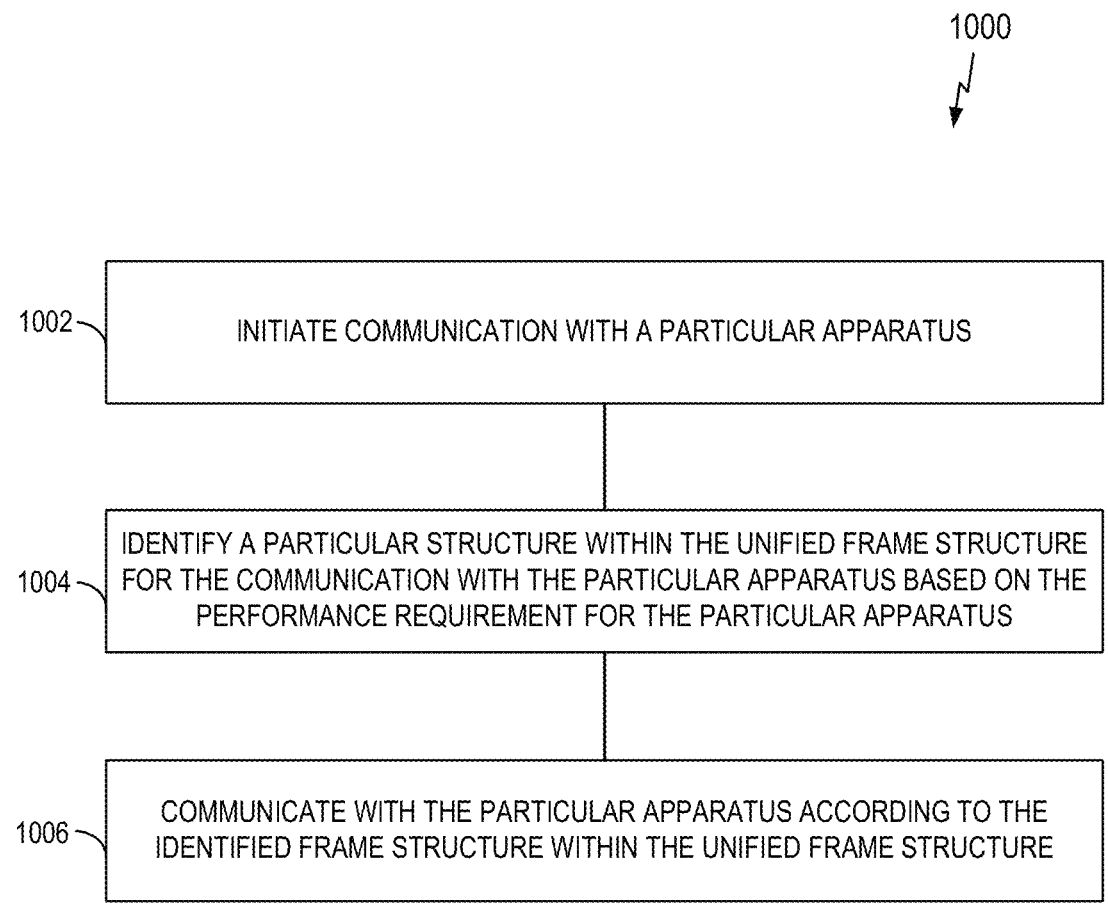
FIG. 10 is a flowchart illustrating an example of a process involving identifying a structure within a unified frame structure in accordance with some aspects of the disclosure.

FIG. 10 illustrates a process 1000 for communication in accordance with some aspects of the disclosure. In some aspects, the process 1000 may be performed in conjunction with (e.g., following) the process 900 of FIG. 9. The process 1000 may take place within a processing circuit (e.g., the processing circuit 810 of FIG. 8), which may be located in a base station, an access terminal, or some other suitable apparatus. In some implementations, the process 1000 represents operations performed by the controller/processor 240 of FIG. 2. Of course, in various aspects within the scope of the disclosure, the process 1000 may be implemented by any suitable apparatus capable of supporting communication-related operations.

At block 1002, a first apparatus (e.g., an access point) initiates communication with a particular second apparatus. For example, an access point may determine that it needs to communicate with one of the access terminals identified at block 902 of FIG. 9. In some aspects, the communication may be initiated via a communication interface.

In some implementations, the circuit/module for initiating communication 826 of FIG. 8 performs the operations of block 1002. In some implementations, the code for initiating communication 834 of FIG. 8 is executed to perform the operations of block 1002.

At block 1004, the first apparatus identifies a particular structure within the unified frame structure for the communication with the second apparatus of block 1002. In some aspects, the identification of this particular structure is based on the performance requirement for the second apparatus. For example, if an access point needs to communicate with a low power access terminal, the access point may determine which structure within the unified frame structure was defined for low power access terminals.

In some implementations, the circuit/module for identifying a structure within a unified frame structure 828 of FIG. 8 performs the operations of block 1004. In some implementations, the code for identifying a structure within a unified frame structure 838 of FIG. 8 is executed to perform the operations of block 1004.

At block 1006, the first apparatus communicates with the second apparatus according to the identified frame structure. For example, an access point may use the TTIs and frequency bands associated with the structure identified at block 1004 to communicate with an access terminal. In some aspects, the communication may be via a communication interface.

In some implementations, the circuit/module for communicating 824 of FIG. 8 performs the operations of block 1006. In some implementations, the code for communicating 834 of FIG. 8 is executed to perform the operations of block 1006.

Figure 11:
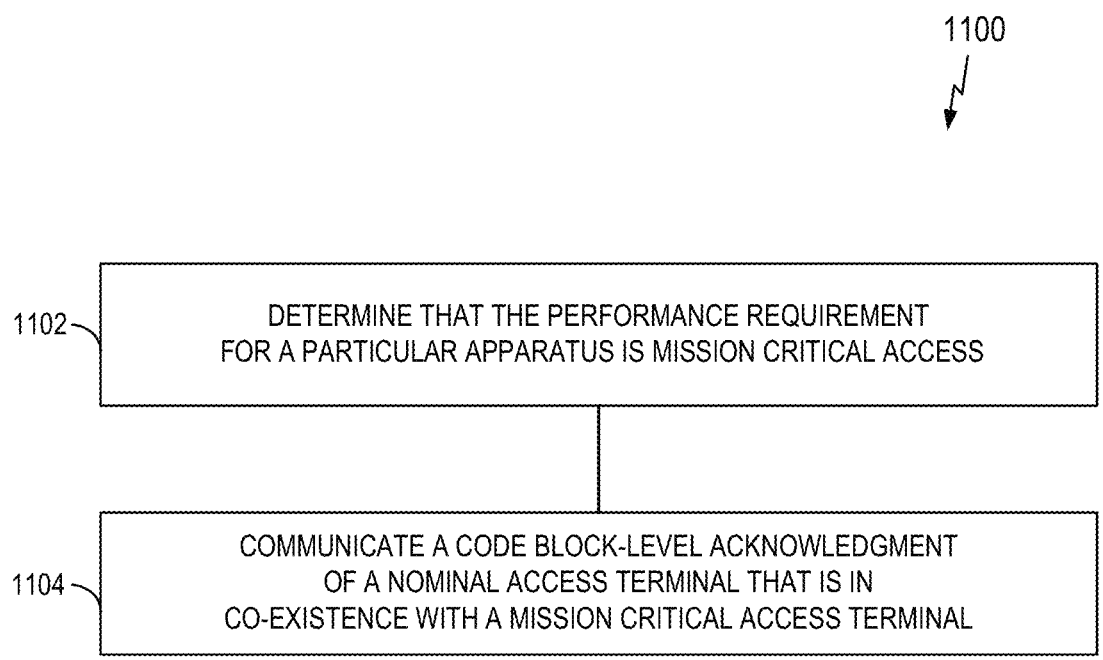
FIG. 11 is a flowchart illustrating an example of a process involving a code-block-level acknowledgement in accordance with some aspects of the disclosure.

Referring now to FIG. 11, in scenarios where there is mission critical access (e.g., coexistence of a mission critical UE and a nominal UE), the process 1000 may further include communicating a code block-level acknowledgement for a nominal UE (e.g., a UE that is not carrying mission critical traffic) to mitigate the impact of a mission critical UE puncturing through the nominal UE's traffic. FIG. 11 illustrates such a process 1100 for communication in accordance with some aspects of the disclosure. In some aspects, the process 1100 may be performed in conjunction with the process 1000 of FIG. 10. For example, block 1102 may correspond in some aspects to block 1004 of FIG. 10 and block 1104 may correspond in some aspects to block 1006 of FIG. 10. The process 1100 may take place within a processing circuit (e.g., the processing circuit 810 of FIG. 8), which may be located in a base station, an access terminal, or some other suitable apparatus. In some implementations, the process 1100 represents operations performed by the controller/processor 240 of FIG. 2. Of course, in various aspects within the scope of the disclosure, the process 1100 may be implemented by any suitable apparatus capable of supporting communication-related operations.

At block 1102, a first apparatus (e.g., an access point) determines that a performance requirement for a second apparatus is mission critical access.

In some implementations, the circuit/module for identifying a performance requirement 820 of FIG. 8 performs the operations of block 1102. In some implementations, the code for identifying a performance requirement 830 of FIG. 8 is executed to perform the operations of block 1102.

At block 1104, the first apparatus communicates (e.g., receives) a code block-level acknowledgment of a nominal access terminal that is in co-existence with a mission critical access terminal. For example, when communicating with a nominal access terminal that co-exists with a mission critical access terminal, the access point may look for block-level ACKs from the access terminal to more efficiently accommodate puncturing that may occur to the data sent to or received from the nominal access terminal. In some aspects, the communication may be via a communication interface.

In some implementations, the circuit/module for communicating 824 of FIG. 8 performs the operations of block 1104. In some implementations, the code for communicating 834 of FIG. 8 is executed to perform the operations of block 1104.

Figure 12:
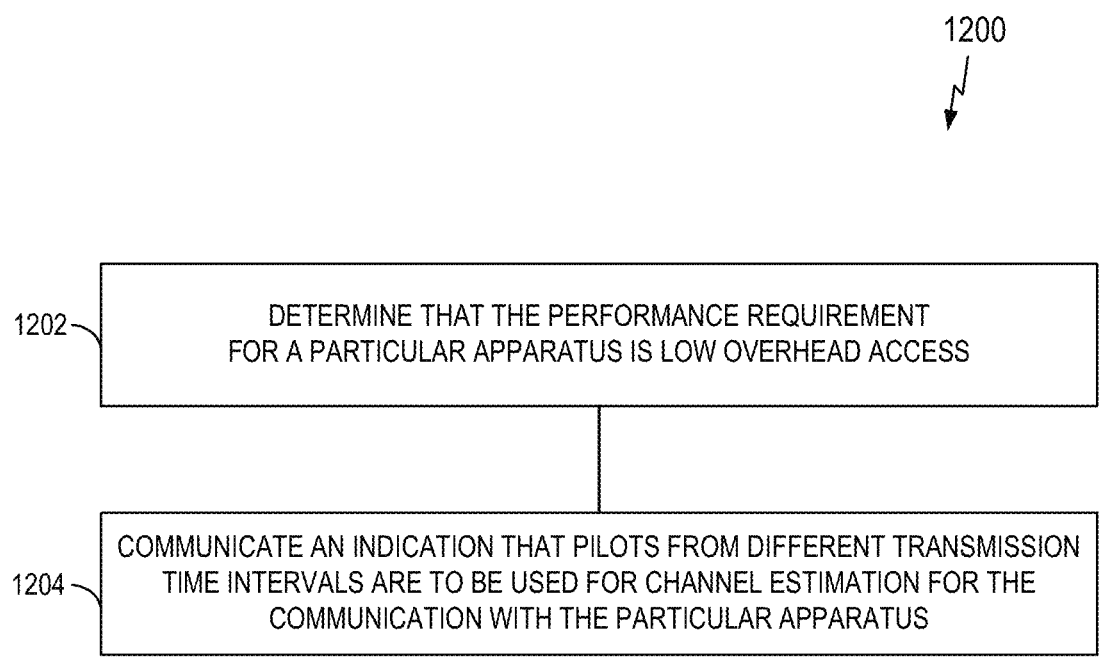
FIG. 12 is a flowchart illustrating an example of a process involving communication of an indication in accordance with some aspects of the disclosure.

Referring to FIG. 12, in scenarios where a particular access requirement is low overhead access, the process 1000 may further include using pilots from different transmission time intervals (TTIs) for channel estimation. FIG. 12 illustrates such a process 1200 for communication in accordance with some aspects of the disclosure. In some aspects, the process 1200 may be performed in conjunction with the process 1000 of FIG. 10. For example, block 1202 may correspond in some aspects to block 1004 of FIG. 10 and block 1204 may correspond in some aspects to block 1006 of FIG. 10. The process 1200 may take place within a processing circuit (e.g., the processing circuit 810 of FIG. 8), which may be located in a base station, an access terminal, or some other suitable apparatus. In some implementations, the process 1200 represents operations performed by the controller/processor 240 of FIG. 2. Of course, in various aspects within the scope of the disclosure, the process 1200 may be implemented by any suitable apparatus capable of supporting communication-related operations.

At block 1202, a first apparatus (e.g., an access point) determines that a performance requirement for a second apparatus is low overhead access.

In some implementations, the circuit/module for identifying a performance requirement 820 of FIG. 8 performs the operations of block 1202. In some implementations, the code for identifying a performance requirement 830 of FIG. 8 is executed to perform the operations of block 1202.

At block 1204, the first apparatus communicates (e.g., transmits) an indication that pilots from different TTIs are to be used for channel estimation for the communication with the second apparatus. For example, an access point may broadcast an indication that tells the access point's associated access terminals to use pilot filtering when estimating the channel between the access point and the respective access terminal. In some aspects, the communication may be via a communication interface.

In some implementations, the circuit/module for communicating 824 of FIG. 8 performs the operations of block 1204. In some implementations, the code for communicating 834 of FIG. 8 is executed to perform the operations of block 1204.

Example Apparatus

Figure 13:
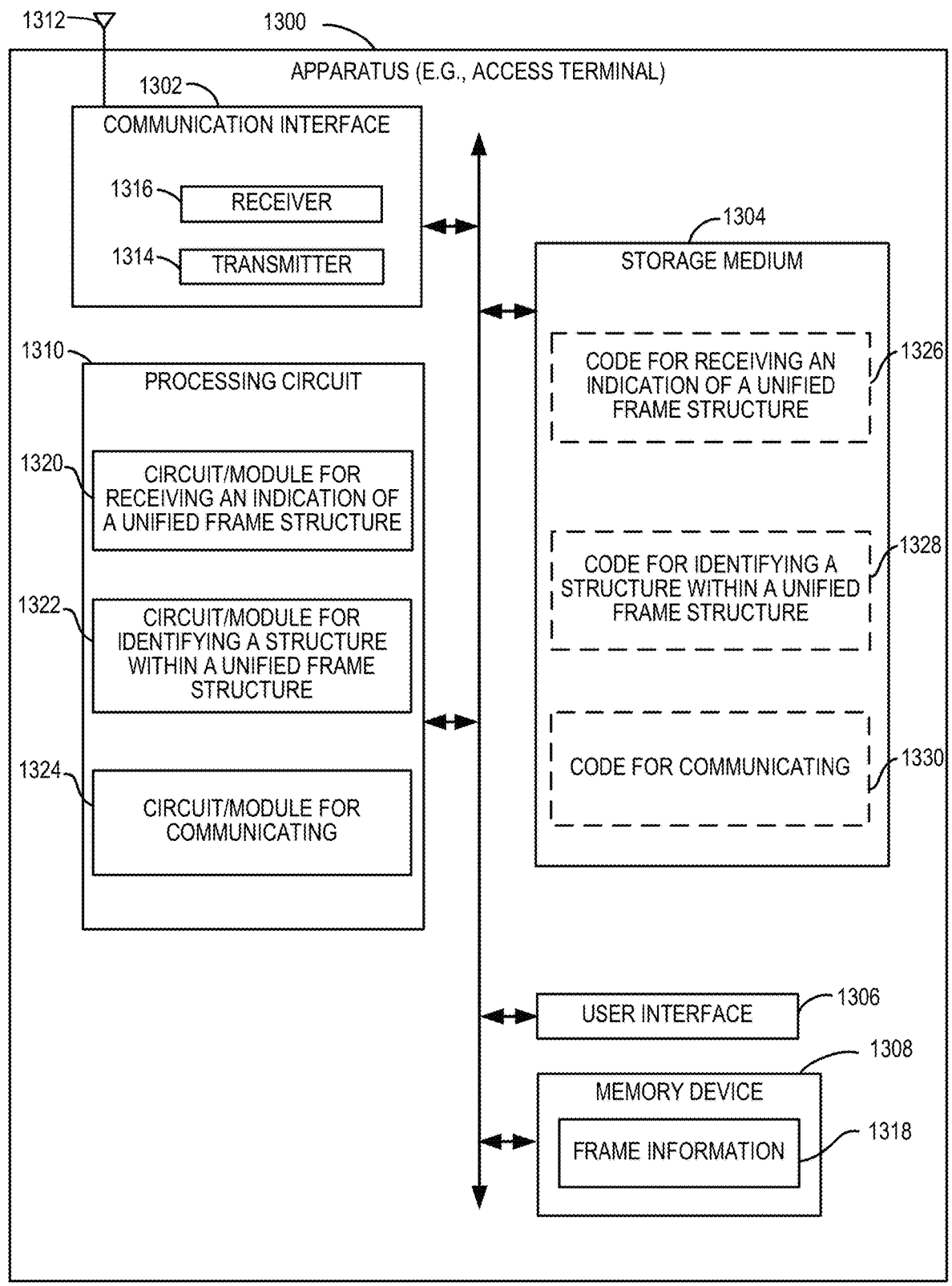
FIG. 13 is a block diagram illustrating another example hardware implementation for an apparatus (e.g., an electronic device) that can execute one or more of the disclosed communication processes (e.g., relating to frame structure and control design) in accordance with some aspects of the disclosure.

FIG. 13 illustrates a block diagram of an example hardware implementation of an apparatus 1300 configured to communicate according to one or more aspects of the disclosure. For example, the apparatus 1300 could embody or be implemented within a UE, an eNB, or some other type of device that supports wireless communication. In various implementations, the apparatus 1300 could embody or be implemented within an access terminal, an access point, or some other type of device. In various implementations, the apparatus 1300 could embody or be implemented within a mobile phone, a smart phone, a tablet, a portable computer, a server, a personal computer, a sensor, an entertainment device, a medical device, or any other electronic device having circuitry.

The apparatus 1300 includes a communication interface (e.g., at least one transceiver) 1302, a storage medium 1304, a user interface 1306, a memory device 1308 (e.g., storing frame-related information 1318), and a processing circuit (e.g., at least one processor) 1310. In various implementations, the user interface 1306 may include one or more of: a keypad, a display, a speaker, a microphone, a touchscreen display, of some other circuitry for receiving an input from or sending an output to a user. The communication interface 1302 may be coupled to one or more antennas 1312, and may include a transmitter 1314 and a receiver 1316. In general, the components of FIG. 13 may be similar to corresponding components of the apparatus 800 of FIG. 8.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-7 and 14. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application specific integrated circuit (ASIC) that serves as a means for (e.g., structure for) carrying out any one of the operations described in conjunction with FIGS. 1-7 and 14. The processing circuit 1310 serves as one example of a means for transmitting and/or a means for receiving. In some implementations, the processing circuit 1310 incorporates the functionality of the controller/processor 290 of FIG. 2.

According to at least one example of the apparatus 1300, the processing circuit 1310 may include one or more of a circuit/module for receiving an indication of a unified frame structure 1320, a circuit/module for identifying a structure within the unified frame structure 1322, or a circuit/module for communicating 1324. In some implementations, the circuit/module for receiving an indication of a unified frame structure 1320, the circuit/module for identifying a structure within the unified frame structure 1322, and the circuit/module for communicating 1324 correspond, at least in part, to the controller/processor 290 of FIG. 2.

The circuit/module for receiving an indication of a unified frame structure 1320 may include circuitry and/or programming (e.g., code for receiving an indication of a unified frame structure 1326 stored on the storage medium 1304) adapted to perform several functions relating to, for example, receiving an indication of a unified frame structure where different structures for different access requirements are multiplexed within the unified frame structure. Initially, the circuit/module for receiving an indication of a unified frame structure 1320 obtains information directly from a device (e.g., a base station) that transmitted the indication or from a component of the apparatus 1300 (e.g., the receiver 1316, the memory device 1308, or some other component). In some implementations, the circuit/module for receiving an indication of a unified frame structure 1320 identifies a memory location of a value in the memory device 1308 and invokes a read of that location. In some implementations, the circuit/module for receiving an indication of a unified frame structure 1320 processes (e.g., decodes) the obtained information to extract the indication. The circuit/module for receiving an indication of a unified frame structure 1320 then outputs the indication to a component of the apparatus 1300 (e.g., the memory device 1308, the circuit/module for identifying a structure within the unified frame structure 1322, or some other component). In some implementations, the receiver 1316 includes the circuit/module for receiving an indication of a unified frame structure 1320 and/or the code for receiving an indication of a unified frame structure 1326.

The circuit/module for identifying a structure within a unified frame structure 1322 may include circuitry and/or programming (e.g., code for identifying a structure within a unified frame structure 1328 stored on the storage medium 1304) adapted to perform several functions relating to, for example, identifying a particular structure within a unified frame structure. In some aspects, the identification may be based on a performance requirement for an apparatus (e.g., the apparatus 1300). Initially, the circuit/module for identifying a structure within a unified frame structure 1322 obtains an indication of the performance requirement for the apparatus (e.g., from the memory device 1308, a data base (not shown), or some other component). The circuit/module for identifying a structure within a unified frame structure 1322 then identifies, based on the performance requirement, a corresponding structure within a unified frame structure as discussed herein. Finally, the circuit/module for identifying a structure within a unified frame structure 1322 outputs an indication of the identified structure to a component of the apparatus 1300 (e.g., the memory device 1308, the circuit/module for communicating 1324, the communication interface 1302, or some other component).

The circuit/module for communicating 1324 may include circuitry and/or programming (e.g., code for communicating 1330 stored on the storage medium 1304) adapted to perform several functions relating to, for example, communicating (e.g., sending and/or receiving) information. In some implementations, the communication interface 1302 includes the circuit/module for communicating 1324 and/or the code for communicating 1330.

In some implementations, the communicating involves the circuit/module for communicating 1324 receiving information directly from a device that transmitted the information or receiving information from a component of the apparatus 1300 (e.g., the receiver 1316, the memory device 1308, or some other component). In this case, the circuit/module for communicating 1324 may process (e.g., decode) the received information. The circuit/module for communicating 1324 then outputs the received information to a component of the apparatus 1300 (e.g., the memory device 1308 or some other component).

In some implementations, the communicating involves sending information to another component of the apparatus 1300 (e.g., the transmitter 1314) for transmission to another device or sending information directly to an ultimate destination (e.g., if the circuit/module for communicating 1324 includes a transmitter). In this case, the circuit/module for communicating 1324 initially obtains information to be communicated. The circuit/module for communicating 1324 may process (e.g., encode) the information to be transmitted. The circuit/module for communicating 1324 then causes the information to be transmitted. For example, the circuit/module for communicating 1324 can directly transmit the information or pass the information to the transmitter 1314 for subsequent radio frequency (RF) transmission.

The circuit/module for communicating 1324 communicates (e.g., sends information and/or receives information) according to an identified structure within a unified frame structure. Initially, the circuit/module for communicating 1324 obtains information about the identified structure within the unified frame structure (e.g., from the memory device 1308, the circuit/module for identifying a structure within a unified frame structure 1322, or some other component). In some scenarios, the circuit/module for communicating 1324 extracts information from a received frame, where the received frame employs the uniform frame structure and includes the identified structure. In this case, the circuit/module for communicating 1324 locates the identified structure within the unified frame structure and extracts the information carried by that structure. In some scenarios, the circuit/module for communicating 1324 sends information via a frame that employs the uniform frame structure and includes the identified structure. In this case, the circuit/module for communicating 1324 locates the identified structure within the unified frame structure and causes the information to be sent via the identified structure.

As mentioned above, programming stored by the storage medium 1304, when executed by the processing circuit 1310, causes the processing circuit 1310 to perform one or more of the various functions and/or process operations described herein. For example, the programming, when executed by the processing circuit 1310, may cause the processing circuit 1310 to perform the various functions, steps, and/or processes described herein with respect to FIGS. 1-7 and 14 in various implementations. As shown in FIG. 13, the storage medium 1304 may include one or more of the code for receiving an indication of a unified frame structure 1326, the code for identifying a structure within the unified frame structure 1328, or the code for communicating 1330.

Example Process

Figure 14:
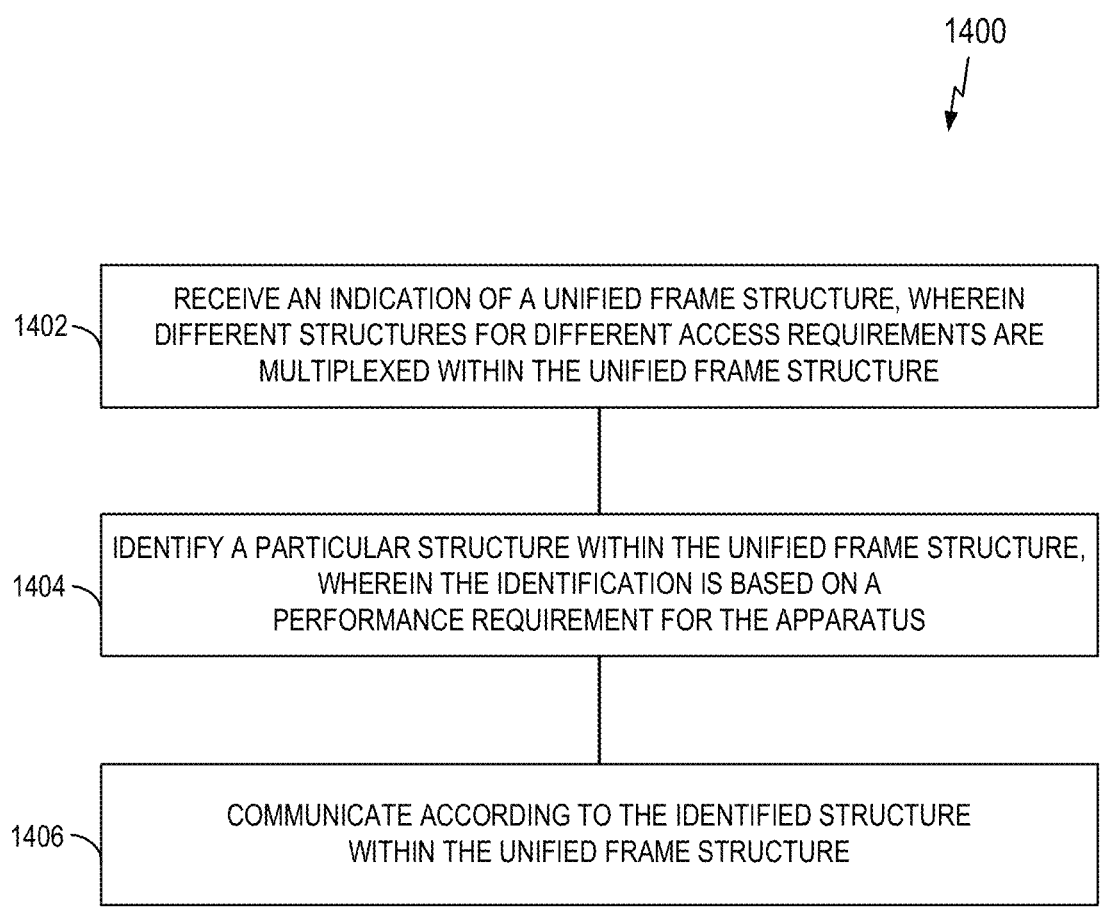
FIG. 14 is a flowchart illustrating another example of a process for communication in accordance with some aspects of the disclosure.

FIG. 14 illustrates a process 1400 for communication in accordance with some aspects of the disclosure. The process 1400 may take place within a processing circuit (e.g., the processing circuit 1310 of FIG. 13), which may be located in an access terminal, a base station, or some other suitable apparatus. In some implementations, the process 1400 represents operations performed by the controller/processor 290 of FIG. 2. Of course, in various aspects within the scope of the disclosure, the process 1400 may be implemented by any suitable apparatus capable of supporting communication-related operations.

At block 1402, an apparatus (e.g., an access terminal) receives an indication of a unified frame structure (e.g., from an access point). In some aspects, different structures for different access requirements may be multiplexed within the unified frame structure.

In some aspects, the different structures include at least one of: different transmission time intervals (TTIs), different frequency bands, or different control structures.

In some aspects, the different control structures include a time division multiplexing control channel structure and a frequency division multiplexing control channel structure. Here, the time division multiplexing control channel structure may be for low power access and/or dynamic bandwidth switching. Also, the frequency division multiplexing control channel structure may be for narrowband access and/or low latency access.

In some implementations, the circuit/module for receiving an indication of a unified frame structure 1320 of FIG. 13 performs the operations of block 1402. In some implementations, the code for receiving an indication of a unified frame structure 1326 of FIG. 13 is executed to perform the operations of block 1402.

At block 1404, the apparatus identifies a particular structure within the unified frame structure. In some aspects, this identification may be based on a performance requirement for the apparatus. In scenarios where the performance requirement is low overhead access, the identified structure may include a lengthened transmission time interval (TTI). In scenarios where the performance requirement is low power access, the identified structure may include a time division multiplexed (TDM) control channel. In scenarios where the performance requirement is low power access, the identified structure may include a narrowband control channel. In scenarios where the performance requirement is low latency access, the identified structure may include a shortened transmission time interval (TTI). In scenarios where the performance requirement is low latency access, the identified structure may include a control channel spread across transmission time intervals (TTIs). In scenarios where the performance requirement is dynamic bandwidth switching, the identified structure may include a narrowband control channel.

In some implementations, the circuit/module for identifying a structure within a unified frame structure 1322 of FIG. 13 performs the operations of block 1404. In some implementations, the code for identifying a structure within a unified frame structure 1328 of FIG. 13 is executed to perform the operations of block 1404.

At block 1406, the apparatus communicates according to the identified structure within the unified frame structure.

For example, an access terminal may use the TTIs and frequency bands associated with the structure identified at block 1404 to communicate with an access point. In some aspects, the communication may be via a communication interface.

In some implementations, the circuit/module for communicating 1324 of FIG. 13 performs the operations of block 1406. In some implementations, the code for communicating 1330 of FIG. 13 is executed to perform the operations of block 1406.

In some aspects, the process 1400 also may include using pilots from different TTIs for channel estimation for the communication if the performance requirement comprises low overhead access.

Example Deployment

Figure 15:
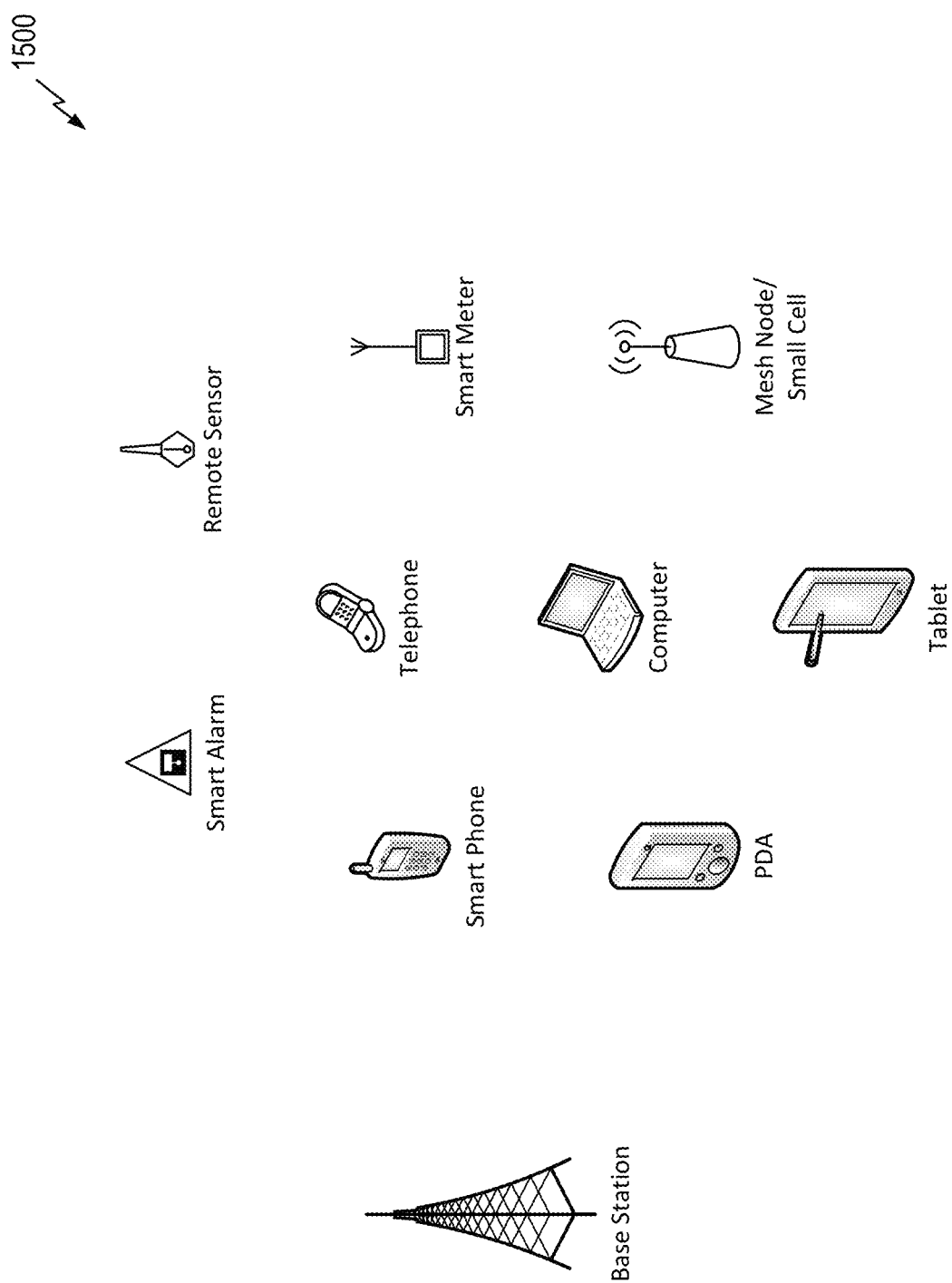
FIG. 15 illustrates an example of a wireless communication network within which aspects of the disclosure may be implemented.

The various concepts presented throughout this disclosure may be implemented across a broad variety of communication systems, network architectures, and communication standards. Referring to FIG. 15, by way of example and without limitation, a wireless communication network 1500 is shown including multiple communication entities as it may appear in some aspects of the disclosure. As described herein, a communication entity (e.g., device) may reside in, or be a part of, an access terminal, a smart phone, a small cell, a base station, or other entity. Subordinate entities or mesh nodes may reside in, or be a part of, a smart alarm, a remote sensor, a smart phone, a telephone, a smart meter, a PDA, a personal computer, a mesh node, a tablet computer, or some other entity. Of course, the illustrated devices or components are merely exemplary in nature, and any suitable node or device may appear within a wireless communication network within the scope of the present disclosure.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" or "at least one or more of" or "one or more of" a list of items refers to any combination of those items, including single members. As an example, "at least one of: a, b, or c" is intended to cover: a; b; c; a and b; a and c; b and c; a, b and c; 2a; 2b; 2c; 2a and b; a and 2b, 2a and 2b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. An apparatus for communication, comprising:
   a communication interface; and
   a processing circuit coupled to the communication interface and configured to:
   identify a first structure for scheduling first traffic within a unified frame structure,
   identify a second structure for scheduling second traffic within the unified frame structure, wherein the second structure schedules at least a portion of the second traffic to puncture at least a portion of the first traffic, wherein the first structure and the second structure are different in at least one of: transmission time intervals (TTIs), frequency bands, or control structures, and
   send, via the communication interface, the first traffic and the second traffic according to the first structure and the second structure within the unified frame structure.

2. The apparatus of claim 1, wherein the second traffic comprises ultra-low latency traffic.

3. The apparatus of claim 2, wherein the first traffic comprises low overhead traffic or nominal traffic.

4. The apparatus of claim 1, wherein the second structure schedules the second traffic over all bandwidth of a particular transmission time interval.

5. The apparatus of claim 1, wherein the processing circuit is further configured to:
   generate an indication of the puncture; and
   send the indication via the communication interface.

6. The apparatus of claim 5, wherein the indication identifies at least one transmission time interval that has been overwritten.

7. The apparatus of claim 1, wherein the processing circuit is further configured to:
   receive, via the communication interface, a code block-level acknowledgement associated with the first traffic; and
   retransmit, via the communication interface, a code block of the first traffic as a result of receiving the code block-level acknowledgement.

8. The apparatus of claim 1, wherein the control structures comprise: at least one time division multiplexing control channel structure, at least one frequency division multiplexing control channel structure, or any combination thereof.

9. A method of communication for an apparatus, comprising:
   identifying a first structure for scheduling first traffic within a unified frame structure;
   identifying a second structure for scheduling second traffic within the unified frame structure, wherein the second structure schedules at least a portion of the second traffic to puncture at least a portion of the first traffic, wherein the first structure and the second structure are different in at least one of: transmission time intervals (TTIs), frequency bands, or control structures; and
   sending the first traffic and the second traffic according to the first structure and the second structure within the unified frame structure.

10. An apparatus for communication, comprising:
    means for identifying a first structure for scheduling first traffic within a unified frame structure;
    means for identifying a second structure for scheduling second traffic within the unified frame structure, wherein the second structure schedules at least a portion of the second traffic to puncture at least a portion of the first traffic, wherein the first structure and the second structure are different in at least one of: transmission time intervals (TTIs), frequency bands, or control structures; and
    means for sending the first traffic and the second traffic according to the first structure and the second structure within the unified frame structure.

11. A non-transitory computer-readable medium storing computer-executable code, including code to:
    identify a first structure for scheduling first traffic within a unified frame structure;
    identify a second structure for scheduling second traffic within the unified frame structure, wherein the second structure schedules at least a portion of the second traffic to puncture at least a portion of the first traffic, wherein the first structure and the second structure are different in at least one of: transmission time intervals (TTIs), frequency bands, or control structures; and
    send the first traffic and the second traffic according to the first structure and the second structure within the unified frame structure.

12. An apparatus for communication, comprising:
a communication interface; and
a processing circuit coupled to the communication interface and configured to:
receive, via the communication interface, first traffic scheduled according to a first structure within a unified frame structure,
determine whether the first traffic was punctured by second traffic scheduled according to a second structure within the unified frame structure, wherein the first structure and the second structure are different in at least one of: transmission time intervals (TTIs), frequency bands, or control structures, and
decode the first traffic based on the determination of whether the first traffic was punctured.

13. The apparatus of claim 12, wherein the second traffic comprises ultra-low latency traffic.

14. The apparatus of claim 13, wherein the first traffic comprises low overhead traffic or nominal traffic.

15. The apparatus of claim 12, wherein the second structure specifies that the second traffic is scheduled over all bandwidth of a particular transmission time interval.

16. The apparatus of claim 12, wherein:
the determination of whether the first traffic was punctured comprises receiving, via the communication interface, an indication of the puncture; and
the decoding comprises electing to not process at least one transmission time interval that was punctured.

17. The apparatus of claim 16, wherein the indication identifies the at least one transmission time interval.

18. The apparatus of claim 12, wherein the processing circuit is further configured to:
determine whether a code block of the first traffic is in error; and
send, via the communication interface, a code block-level acknowledgement as a result of the determination.

19. The apparatus of claim 12, wherein the control structures comprise: at least one time division multiplexing control channel structure, at least one frequency division multiplexing control channel structure, or any combination thereof.

20. A method of communication for an apparatus, comprising:
receiving first traffic scheduled according to a first structure within a unified frame structure;
determining whether the first traffic was punctured by second traffic scheduled according to a second structure within the unified frame structure, wherein the first structure and the second structure are different in at least one of: transmission time intervals (TTIs), frequency bands, or control structures; and
decoding the first traffic based on the determination of whether the first traffic was punctured.

21. An apparatus for communication, comprising:
means for receiving first traffic scheduled according to a first structure within a unified frame structure;
means for determining whether the first traffic was punctured by second traffic scheduled according to a second structure within the unified frame structure, wherein the first structure and the second structure are different in at least one of: transmission time intervals (TTIs), frequency bands, or control structures; and
means for decoding the first traffic based on the determination of whether the first traffic was punctured.

22. A non-transitory computer-readable medium storing computer-executable code, including code to:
receive first traffic scheduled according to a first structure within a unified frame structure;
determine whether the first traffic was punctured by second traffic scheduled according to a second structure within the unified frame structure, wherein the first structure and the second structure are different in at least one of: transmission time intervals (TTIs), frequency bands, or control structures; and
decode the first traffic based on the determination of whether the first traffic was punctured.

23. An apparatus for communication, comprising:
a communication interface; and
a processing circuit coupled to the communication interface and configured to:
identify a first structure for scheduling first traffic within a unified frame structure,
send, via the communication interface, the first traffic according to the first structure within the unified frame structure, and
receive, via the communication interface, a code block-level acknowledgement associated with the first traffic.

24. The apparatus of claim 23, wherein:
the code block-level acknowledgement indicates that a code block of the first traffic was received in error; and
the processing circuit is further configured to retransmit the code block via the communication interface as a result of receiving the code block-level acknowledgement.

25. The apparatus of claim 23, wherein the processing circuit is further configured to:
identify a second structure for scheduling second traffic within the unified frame structure, wherein the second structure schedules at least a portion of the second traffic to puncture at least a portion of the first traffic; and
send, via the communication interface, the second traffic according to the second structure within the unified frame structure.

26. The apparatus of claim 25, wherein:
the first traffic comprises low overhead traffic or nominal traffic; and
the second traffic comprises ultra-low latency traffic.

27. The apparatus of claim 25, wherein the code block-level acknowledgement is received from an access terminal configured for co-existence with an access terminal configured to receive the second traffic.

28. A method of communication for an apparatus, comprising:
identifying a first structure for scheduling first traffic within a unified frame structure;
sending the first traffic according to the first structure within the unified frame structure; and
receiving a code block-level acknowledgement associated with the first traffic.

29. An apparatus for communication, comprising:
means for identifying a first structure for scheduling first traffic within a unified frame structure;
means for sending the first traffic according to the first structure within the unified frame structure; and
means for receiving a code block-level acknowledgement associated with the first traffic.

30. A non-transitory computer-readable medium storing computer-executable code, including code to:
   identify a first structure for scheduling first traffic within a unified frame structure;
   send the first traffic according to the first structure within the unified frame structure; and
   receive a code block-level acknowledgement associated with the first traffic.

31. An apparatus for communication, comprising:
   a communication interface; and
   a processing circuit coupled to the communication interface and configured to:
      identify a first structure for scheduling first traffic within a unified frame structure,
      receive, via the communication interface, the first traffic according to the first structure within the unified frame structure,
      determine whether a block of the first traffic was received in error, and
      send, via the communication interface, a code block-level acknowledgement that indicates whether the block of the first traffic was received in error.

32. The apparatus of claim 31, wherein the determination of whether the block of the first traffic was received in error comprises:
   determining that the first traffic was punctured by second traffic scheduled according to a second structure within the unified frame structure.

33. The apparatus of claim 32, wherein:
   the first traffic comprises low overhead traffic or nominal traffic; and
   the second traffic comprises ultra-low latency traffic.

34. The apparatus of claim 33, wherein the apparatus is configured for co-existence with an access terminal configured to receive the second traffic.

35. A method of communication for an apparatus, comprising:
   identifying a first structure for scheduling first traffic within a unified frame structure;
   receiving the first traffic according to the first structure within the unified frame structure;
   determining whether a block of the first traffic was received in error; and
   sending a code block-level acknowledgement that indicates whether the block of the first traffic was received in error.

36. An apparatus for communication, comprising:
   means for identifying a first structure for scheduling first traffic within a unified frame structure;
   means for receiving the first traffic according to the first structure within the unified frame structure;
   means for determining whether a block of the first traffic was received in error; and
   means for sending a code block-level acknowledgement that indicates whether the block of the first traffic was received in error.

37. A non-transitory computer-readable medium storing computer-executable code, including code to:
   identify a first structure for scheduling first traffic within a unified frame structure;
   receive the first traffic according to the first structure within the unified frame structure;
   determine whether a block of the first traffic was received in error; and
   send a code block-level acknowledgement that indicates whether the block of the first traffic was received in error.

* * * * *